United States Patent
Uchida

(10) Patent No.: US 8,063,819 B2
(45) Date of Patent: Nov. 22, 2011

(54) POSITIONING DEVICE, POSITIONING CONTROL METHOD, POSITIONING CONTROL PROGRAM, AND COMPUTER-READABLE RECORDING MEDIUM HAVING POSITIONING CONTROL PROGRAM RECORDED THEREON

(75) Inventor: Shuji Uchida, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 124 days.

(21) Appl. No.: 12/494,918

(22) Filed: Jun. 30, 2009

(65) Prior Publication Data
US 2009/0262021 A1 Oct. 22, 2009

Related U.S. Application Data

(62) Division of application No. 11/723,877, filed on Mar. 22, 2007, now Pat. No. 7,570,206.

(30) Foreign Application Priority Data

Mar. 23, 2006 (JP) ................................. 2006-081532
Mar. 23, 2006 (JP) ................................. 2006-081533

(51) Int. Cl.
*G01S 19/29* (2010.01)
(52) U.S. Cl. ................................. 342/357.68
(58) Field of Classification Search ... 342/357.2–357.78
See application file for complete search history.

(56) References Cited

U.S. PATENT DOCUMENTS

| | | | |
|---|---|---|---|
| 5,535,278 A | | 7/1996 | Cahn et al. |
| 5,987,059 A * | | 11/1999 | Harrison et al. ............... 375/150 |
| 6,201,828 B1 | | 3/2001 | El-Tarhuni et al. |
| 6,380,891 B1 | | 4/2002 | Yamashita |
| 7,295,155 B2 * | | 11/2007 | Wakamatsu ............. 342/357.67 |
| 2002/0084933 A1 | | 7/2002 | Krasner |
| 2003/0072356 A1 | | 4/2003 | Abraham et al. |

(Continued)

FOREIGN PATENT DOCUMENTS

| | | |
|---|---|---|
| JP | H10-339772 A | 12/1998 |
| JP | 2000-312163 A | 11/2000 |
| JP | 2003-98244 A | 4/2003 |

(Continued)

OTHER PUBLICATIONS

Yang C: "GPS Signal Tracking with Kalman Filter Based on Joint Code Delay and Carrier Phase and Frequency Error Discriminator" Ion Annual Meeting, Jun. 7-9, 2004pp. 631-640, XP007901920.

*Primary Examiner* — Thomas Tarcza
*Assistant Examiner* — Nga X Nguyen
(74) *Attorney, Agent, or Firm* — Global IP Counselors, LLP

(57) ABSTRACT

A positioning device comprising: a peak frequency determination section which determines a peak frequency which is a reception frequency corresponding to a maximum correlation value of a specific positioning base code replica and a positioning base code carried on a radio wave from a specific transmission source; a reference frequency calculation section which calculates a low frequency which is a frequency lower than the peak frequency and a high frequency which is a frequency higher than the peak frequency; a reference correlation value calculation section which calculates the correlation value corresponding to the low frequency and the correlation value corresponding to the high frequency; a corrected peak frequency calculation section which calculates a corrected peak frequency based on the correlation value corresponding to the peak frequency, the peak frequency, the correlation value corresponding to the low frequency, the low frequency, the correlation value corresponding to the high frequency, and the high frequency; and a radio wave reception section which receives the radio wave using the corrected peak frequency.

5 Claims, 26 Drawing Sheets

U.S. PATENT DOCUMENTS

| | | |
|---|---|---|
| 2005/0080561 A1 | 4/2005 | Abraham et al. |
| 2005/0147191 A1 | 7/2005 | Geier et al. |
| 2006/0287823 A1 | 12/2006 | Hsu |
| 2007/0109189 A1 | 5/2007 | Jia et al. |

FOREIGN PATENT DOCUMENTS

| | | |
|---|---|---|
| JP | 2003-255036 A | 9/2003 |
| JP | 2004-12378 A | 1/2004 |
| WO | WO-2004/036239 A2 | 4/2004 |

* cited by examiner

FIG.1
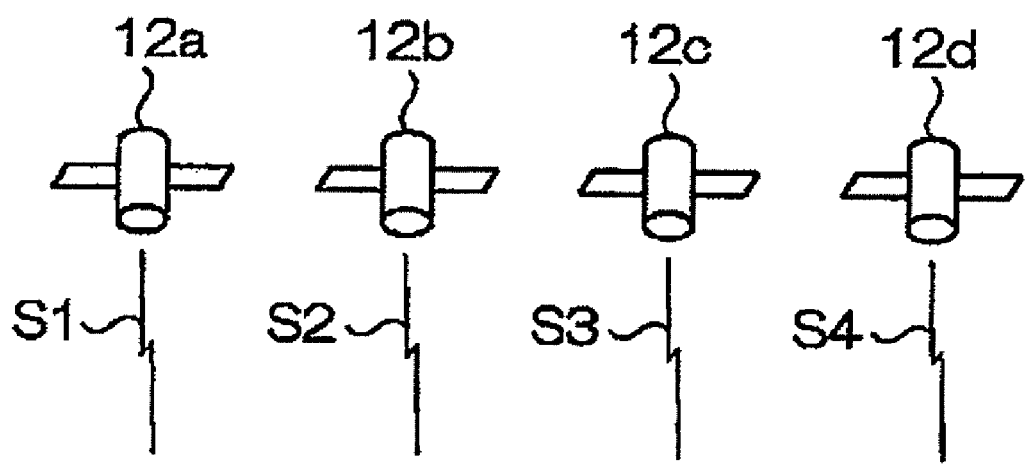
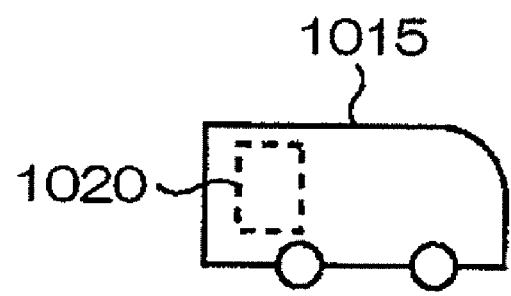

FIG.5

FIRST ESTIMATED FREQUENCY $\alpha$
= TRANSMISSION FREQUENCY H1 + DOPPLER SHIFT H2

C/A CODE RECEIVED FROM GPS SATELLITE 12a

C/A CODE REPLICA

1chip

SAMPLING PHASE

FIRST PHASE WIDTH W1 = 1/32ND OF CHIP

FIRST SAMPLING PHASE SC1
= PHASES AT INTERVALS OF FIRST PHASE WIDTH W1

*SNR1=Pmax/Pnoise

*SETS RECEPTION FREQUENCY AT Fr

*SNR2=Pmax/Pnoise

FIG.18

ESTIMATED FREQUENCY $\beta$
= TRANSMISSION FREQUENCY H1 + DOPPLER SHIFT H2

FIRST PHASE WIDTH W1 = 1/32ND OF CHIP
FIRST SAMPLING PHASE SC1
= PHASES AT INTERVALS OF FIRST PHASE WIDTH W1

FIRST PHASE WIDTH W1 = 1/32ND OF CHIP

FIRST SAMPLING PHASE SC1
= PHASES AT INTERVALS OF FIRST PHASE WIDTH W1

SECOND PHASE WIDTH W1 = 1/64TH OF CHIP

SECOND SAMPLING PHASE SC2
= PHASES AT INTERVALS OF SECOND PHASE WIDTH W1

POSITIONING DEVICE, POSITIONING
CONTROL METHOD, POSITIONING
CONTROL PROGRAM, AND
COMPUTER-READABLE RECORDING
MEDIUM HAVING POSITIONING CONTROL
PROGRAM RECORDED THEREON

CROSS-REFERENCE TO THE RELATED
APPLICATION

This is a divisional application of U.S. patent application Ser. No. 11/723,877 filed on Mar. 22, 2007, which claims priority to Japanese Patent Application No. 2006-81532 filed on Mar. 23, 2006, and Japanese Patent Application No. 2006-81533 filed on Mar. 23, 2006. The entire disclosure of U.S. patent application Ser. No. 11/723,877, Japanese Patent Application No. 2006-81532, and Japanese Patent Application No. 2006-81533 are hereby incorporated by reference.

BACKGROUND OF THE INVENTION

The present invention relates to a positioning device, a positioning control method, a positioning control program, and a computer-readable recording medium having a positioning control program recorded thereon.

A positioning system has been used which locates the present position of a GPS receiver utilizing a satellite navigation system such as a global positioning system (GPS).

The GPS receiver receives a clear and acquisition or coarse and access (C/A) code which is one type of pseudo-random noise code (hereinafter called "PN code") carried on a radio wave from a GPS satellite (hereinafter called "satellite radio wave") based on a navigation message indicating the orbit of the GPS satellite and the like (including approximate satellite orbital information: almanac, precise satellite orbital information: ephemeris, and the like). The C/A code is a code which forms the basis for positioning.

The GPS receiver determines the GPS satellite which has transmitted the received C/A code, and calculates the distance (pseudo-range) between the GPS satellite and the GPS receiver based on the transmission time and the reception time of the C/A code, for example. The GPS receiver locates the position of the GPS receiver based on the pseudo-range between the GPS receiver and each of three or more GPS satellites and the position of each GPS satellite in the satellite orbit (see JP-A-10-339772).

The GPS receiver synchronizes the received C/A code with a C/A code replica in the GPS receiver, and calculates a phase indicating the maximum correlation value (hereinafter called "code phase"). The GPS receiver calculates the pseudo-range using the code phase.

Specifically, the C/A code has a bit rate of 1.023 Mbps and a code length of 1023 chips. Therefore, it is considered that the C/A codes line up in units of about 300 kilometers (km) at which a radio wave advances in 1 millisecond (ms). Therefore, the pseudo-range can be calculated by calculating the number of C/A codes existing between the GPS satellite and the GPS receiver from the position of the GPS satellite in the satellite orbit and the approximate position of the GPS receiver, and determining the phase of the C/A code.

Since the C/A code is carried on the satellite radio wave, it is necessary to synchronize the C/A codes and synchronize the carrier frequency (intermediate-frequency (IF) carrier frequency) of the received satellite radio wave with the frequency inside the GPS receiver (hereinafter called "frequency synchronization") in order to accurately synchronize the C/A codes.

When the correlation result (coherent result) can be output in time units as short as 1 millisecond (ms) due to the high signal strength of the satellite radio wave, the frequencies can be synchronized by forming a phase locked loop (PLL) which corrects the frequency based on the coherent result (see paragraph [0020] of JP-A-2003-98244, for example).

However, the frequencies cannot be synchronized using the PLL when the strength of the satellite radio wave is low. It becomes impossible to synchronize the codes with the lapse of time.

A technology has been proposed which sets an estimated IF carrier frequency by estimating the original IF carrier frequency, and reduces the difference in signal level between a frequency higher than the estimated IF carrier frequency by a specific value and a frequency lower than the estimated IF carrier frequency by the specific value to bring the estimated IF carrier frequency closer to the true IF carrier frequency (see JP-A-2003-255036, for example).

In order to cause the phase of the C/A code replica generated in the GPS receiver to coincide with the phase of the received C/A code, a correlation process is performed while changing the phase of the C/A code replica. Note that the correlation process is performed while changing the reception frequency. Description thereof is omitted from this specification.

A graph indicating the correlation value in coordinates of which the horizontal axis indicates the phase and the vertical axis indicates the correlation value theoretically forms an isosceles triangle having the maximum correlation value as the vertex. A method has been used which generates C/A code replicas with a phase (EARLY) or a phase (LATE) which advances or is delayed by a specific amount from a phase (PUNCTUAL) considered to be an intermediate phase, correlates the C/A code replicas with the phases EARLY and LATE with the received C/A code, and controls the phases of the C/A code replicas so that the correlation values become equal. The intermediate phase between the phases EARLY and LATE when the correlation values of the phases EARLY and LATE are equal is estimated to be the phase of the received C/A code.

The signal from the GPS satellite may reach the GPS receiver as an indirect wave which enters after being reflected by a building or the like (hereinafter called "multipath") in addition to a direct wave. In this case, the isosceles triangle having the maximum correlation value as the vertex is deformed, whereby the phase of the received C/A code cannot be accurately estimated by the above method.

A technology has been proposed in which the correlation process is performed while reducing the difference between the phases EARLY and LATE (narrow correlator technology) (JP-A-2000-312163, for example).

However, the following two problems occur when the signal strength of the satellite radio wave is extremely low.

A first problem is that it is necessary to appropriately determine the estimated IF carrier frequency. Specifically, the estimated IF carrier frequency cannot be appropriately determined when the signal strength of the satellite radio wave is extremely low.

A second is that, when the signal strength of the satellite radio wave is extremely low, the correlation values of the phases EARLY and LATE become equal at a plurality of positions in the graph indicating the correlation value, as shown in FIG. 26. For example, when the phase EARLY is a phase Qe1 and the phase LATE is a phase Qe2, the correlation values of the phases Qe1 and Qe2 are equal, and the intermediate phase between the phases Qe1 and Qe2 is a phase Qe3. However, the phase Qe3 differs from the true phase Qr.

As described above, when the signal strength is extremely low (electric field is weak), the phase of the received C/A code may not be accurately estimated by the above narrow correlator technology. In this specification, the term "signal strength" is used synonymously with the term "radio wave strength".

SUMMARY

According to one aspect of the invention, there is provided a positioning device comprising:

a peak frequency determination section which determines a peak frequency which is a reception frequency corresponding to a maximum correlation value of a specific positioning base code replica and a positioning base code carried on a radio wave from a specific transmission source;

a reference frequency calculation section which calculates a low frequency which is a frequency lower than the peak frequency and a high frequency which is a frequency higher than the peak frequency;

a reference correlation value calculation section which calculates the correlation value corresponding to the low frequency and the correlation value corresponding to the high frequency;

a corrected peak frequency calculation section which calculates a corrected peak frequency based on the correlation value corresponding to the peak frequency, the peak frequency, the correlation value corresponding to the low frequency, the low frequency, the correlation value corresponding to the high frequency, and the high frequency; and a radio wave reception section which receives the radio wave using the corrected peak frequency.

According to another aspect of the invention, there is provided a positioning device comprising:

a first correlation value calculation section which performs a correlation process of a specific positioning base code replica and a positioning base code and calculates a correlation value in units of first sampling phases which are phases at intervals of a first divided phase width which is a phase width obtained by equally dividing a phase range specified by a base unit of a positioning base code formed of a plurality of base units from a transmission source into at least three sections;

a first phase determination section which determines a first phase which is a sampling phase corresponding to the maximum correlation value;

a first positioning phase calculation section which calculates a first positioning phase used for positioning based on three consecutive first sampling phases including the first phase and the correlation values corresponding to the three consecutive first sampling phases including the first phase; and a first located position calculation section which calculates a present located position based on the first positioning phases corresponding to three or more of the transmission sources.

BRIEF DESCRIPTION OF THE SEVERAL VIEWS OF THE DRAWING

FIG. 1 is a schematic view showing a terminal and the like according to a first embodiment.

FIG. 5 is a view illustrative of a first estimated frequency calculation program according to the first embodiment.

FIG. 18 is a view illustrative of an estimated frequency calculation program according to the second embodiment.

DETAILED DESCRIPTION OF THE EMBODIMENT

Figure 2:
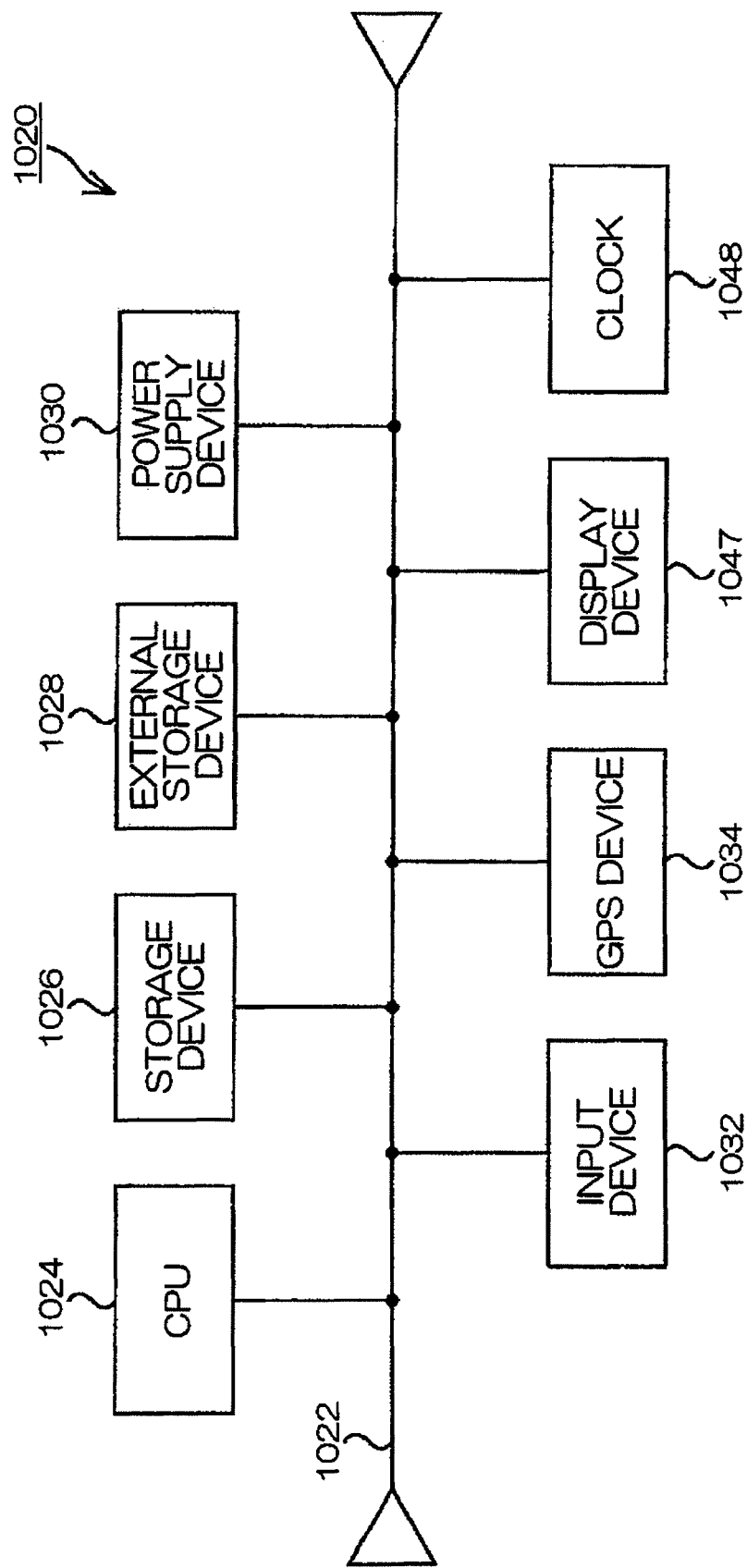
FIG. 2 is a schematic view showing the main hardware configuration of the terminal according to the first embodiment.

The invention enables accurate positioning even when the signal strength of a satellite radio wave is extremely low.

According to one embodiment of the invention, there is provided a positioning device comprising:

a peak frequency determination section which determines a peak frequency which is a reception frequency corresponding to a maximum correlation value of a specific positioning base code replica and a positioning base code carried on a radio wave from a specific transmission source;

a reference frequency calculation section which calculates a low frequency which is a frequency lower than the peak frequency and a high frequency which is a frequency higher than the peak frequency;

a reference correlation value calculation section which calculates the correlation value corresponding to the low frequency and the correlation value corresponding to the high frequency;

a corrected peak frequency calculation section which calculates a corrected peak frequency based on the correlation value corresponding to the peak frequency, the peak frequency, the correlation value corresponding to the low frequency, the low frequency, the correlation value corresponding to the high frequency, and the high frequency; and a radio wave reception section which receives the radio wave using the corrected peak frequency.

According to this embodiment, since the positioning device includes the peak frequency determination section, the positioning device can determine the peak frequency.

Since the positioning device includes the corrected peak frequency calculation section, the positioning device can calculate the corrected peak frequency based on a first point specified by the correlation value corresponding to the peak frequency and peak frequency, a second point specified by the correlation value corresponding to the low frequency and the low frequency, and a third point specified by the correlation value corresponding to the high frequency and the high frequency.

When the phase of the positioning base code replica is fixed, a graph indicating the relationship between the correlation value and the reception frequency (IF carrier frequency) theoretically forms an isosceles triangle having a point corresponding to the maximum correlation value as the vertex. The first point is positioned near the vertex of the isosceles triangle, and the second and third points are positioned on different oblique sides. Since one of the second and third points is positioned on the same oblique side as the first point, the gradient of the oblique side can be determined. If the gradient of one oblique side of an isosceles triangle can be determined, the gradient of the other oblique side can also be determined. The intersection of the two oblique sides is the vertex. The frequency corresponding to the vertex is the corrected peak frequency.

As described above, even if the estimated IF carrier frequency cannot be appropriately determined when the signal strength of the satellite radio wave is extremely low, one peak frequency necessarily exists. If the peak frequency is determined, the corrected peak frequency can be calculated by the corrected peak frequency calculation section without being limited to the search width of the frequency search.

Since the positioning device includes the radio wave reception section, the positioning device can receive the radio wave using the corrected peak frequency. Therefore, the correlation value can be accurately calculated, whereby the present position can be accurately calculated.

This makes it possible to accurately locate the position without determining the IF carrier frequency when the signal strength of the satellite radio wave is extremely low.

The positioning device according to this embodiment may comprise:

a reception frequency control section which controls the reception frequency so that a coherent value of the positioning base code replica and the positioning base code is maximized.

According to this feature, since the positioning device includes the reception frequency control section, the positioning device can control the reception frequency so that the coherent value of the positioning base code replica and the positioning base code is maximized.

This makes it possible to continuously bring the reception frequency close to the IF carrier frequency of the radio wave when the signal strength of the radio wave is within a specific strength range.

In the positioning device according to this embodiment, the corrected peak frequency calculation section and the reception frequency control section may operate in parallel.

According to this feature, the positioning device can control the reception frequency so that the coherent value of the positioning base code replica and the positioning base code is maximized when the signal strength of the radio wave is higher than a specific strength range. The positioning device can receive the radio wave using the corrected peak frequency when the signal strength of the radio wave is lower than a specific strength.

Therefore, the position can be continuously and accurately located when the signal strength has transitioned from a value greater than a specific strength to a value smaller than the specific strength.

In the positioning device according to this embodiment, the transmission source may be a positioning satellite.

According to another embodiment of the invention, there is provided a positioning device comprising:

a first correlation value calculation section which performs a correlation process of a specific positioning base code replica and a positioning base code and calculates a correlation value in units of first sampling phases which are phases at intervals of a first divided phase width which is a phase width obtained by equally dividing a phase range specified by a base unit of a positioning base code formed of a plurality of base units from a transmission source into at least three sections;

a first phase determination section which determines a first phase which is a sampling phase corresponding to the maximum correlation value;

a first positioning phase calculation section which calculates a first positioning phase used for positioning based on three consecutive first sampling phases including the first phase and the correlation values corresponding to the three consecutive first sampling phases including the first phase; and a first located position calculation section which calculates a present located position based on the first positioning phases corresponding to three or more of the transmission sources.

According to this embodiment, since the positioning device includes the first correlation value calculation section, the positioning device can calculate the correlation values of at least three first sampling phases in units of base units. Since the positioning device includes the first phase determination section, the positioning device can determine the first phase. Since the positioning device includes the first positioning phase calculation section, the positioning device can determine the first positioning phase. Since the positioning device includes the located position calculation section, the positioning device can calculate the located position. As described above, the correlation values of the phases EARLY and LATE phases may become equal at a plurality of positions in a weak electric field. On the other hand, only one first phase corresponds to the maximum correlation value. Therefore, the true phase exists in the range of the first divided phase width with respect to the first phase.

Since the graph of the correlation value forms an approximate isosceles triangle near the first phase even in a weak electric field, the first positioning phase, which is the phase corresponding to the vertex of the isosceles triangle, can be calculated from three sampling phases including the first phase and the corresponding correlation values. The first positioning phase is closer to the true phase than the first phase.

This enables the phase of the received positioning base code to be accurately estimated even in a weak electric field in which the signal strength is extremely low.

The positioning device according to this embodiment may comprise:

a reception strength range determination section which determines whether or not a strength of a radio wave which carries the positioning base code is within a predetermined reception strength range;

a second correlation value calculation section which performs the correlation process of the positioning base code replica and the positioning base code and calculates the correlation value in units of second sampling phases which are phases at intervals of a second divided phase width obtained by equally dividing a phase range specified by the base unit by the second divided phase width which is smaller than the first divided phase width based on the determination results of the reception strength range determination section;

a second phase determination section which determines a second phase which is a phase of the positioning base code replica corresponding to the maximum correlation value;

a second positioning phase calculation section which calculates a second positioning phase used for positioning based on three consecutive sampling phases including the second phase and the correlation values corresponding to the three consecutive sampling phases including the second phase; and a second located position calculation section which calculates the present located position based on the second positioning phases corresponding to three or more of the transmission sources.

According to this feature, since the positioning device includes the second correlation value calculation section, the positioning device can perform the correlation process of the positioning base code replica and the positioning base code in units of second sampling phases and calculate the correlation values.

Since the positioning device includes the second phase determination section, the positioning device can determine the second phase. Since the positioning device includes the second positioning phase calculation section, the positioning device can calculate the second positioning phase. Therefore, the second positioning phase is closer to the true phase than the first positioning phase.

This enables the phase of the received positioning base code to be accurately estimated even in a weak electric field in which the signal strength is extremely low to a further extent.

In the positioning device according to this embodiment, the transmission source may be a positioning satellite;

the positioning base code may be a clear and acquisition or coarse and access (C/A) code; and the base unit may be a chip forming the C/A code.

According to a further embodiment of the invention, there is provided a positioning control method comprising:

a peak frequency determination step of determining a peak frequency which is a reception frequency corresponding to a maximum correlation value of a specific positioning base code replica and a positioning base code carried on a radio wave from a specific transmission source;

a reference frequency calculation step of calculating a low frequency which is a frequency lower than the peak frequency and a high frequency which is a frequency higher than the peak frequency;

a reference correlation value calculation step of calculating the correlation value corresponding to the low frequency and the correlation value corresponding to the high frequency;

a corrected peak frequency calculation step of calculating a corrected peak frequency based on the correlation value corresponding to the peak frequency, the peak frequency, the correlation value corresponding to the low frequency, the low frequency, the correlation value corresponding to the high frequency, and the high frequency; and a radio wave reception step of receiving the radio wave using the corrected peak frequency.

This makes it possible to accurately locate the position without determining the IF carrier frequency when the signal strength of the satellite radio wave is extremely low.

According to a further embodiment of the invention, there is provided a positioning control program causing a computer to execute:

a peak frequency determination step of determining a peak frequency which is a reception frequency corresponding to a maximum correlation value of a specific positioning base code replica and a positioning base code carried on a radio wave from a specific transmission source;

a reference frequency calculation step of calculating a low frequency which is a frequency lower than the peak frequency and a high frequency which is a frequency higher than the peak frequency;

a reference correlation value calculation step of calculating the correlation value corresponding to the low frequency and the correlation value corresponding to the high frequency;

a corrected peak frequency calculation step of calculating a corrected peak frequency based on the correlation value corresponding to the peak frequency, the peak frequency, the correlation value corresponding to the low frequency, the low frequency, the correlation value corresponding to the high frequency, and the high frequency; and a radio wave reception step of receiving the radio wave using the corrected peak frequency.

According to a further embodiment of the invention, there is provided a computer-readable recording medium having recorded thereon a positioning control program which causes a computer to execute:

a peak frequency determination step of determining a peak frequency which is a reception frequency corresponding to a maximum correlation value of a specific positioning base code replica and a positioning base code carried on a radio wave from a specific transmission source;

a reference frequency calculation step of calculating a low frequency which is a frequency lower than the peak frequency and a high frequency which is a frequency higher than the peak frequency;

a reference correlation value calculation step of calculating the correlation value corresponding to the low frequency and the correlation value corresponding to the high frequency;

a corrected peak frequency calculation step of calculating a corrected peak frequency based on the correlation value corresponding to the peak frequency, the peak frequency, the correlation value corresponding to the low frequency, the low frequency, the correlation value corresponding to the high frequency, and the high frequency; and a radio wave reception step of receiving the radio wave using the corrected peak frequency.

According to a further embodiment of the invention, there is provided a positioning control method comprising:

a first correlation value calculation step of performing a correlation process of a specific positioning base code replica and a positioning base code and calculating a correlation value in units of first sampling phases which are phases at intervals of a first divided phase width which is a phase width obtained by equally dividing a phase range specified by a base unit of a positioning base code formed of a plurality of base units from a transmission source into at least three sections;

a first phase determination step of determining a first phase which is a sampling phase corresponding to the maximum correlation value;

a first positioning phase calculation step of calculating a first positioning phase used for positioning based on three consecutive first sampling phases including the first phase and the correlation values corresponding to the three consecutive first sampling phases including the first phase; and a first located position calculation step of calculating a present located position based on the first positioning phases corresponding to three or more of the transmission sources.

According to a further embodiment of the invention, there is provided a positioning control program causing a computer to execute:

a first correlation value calculation step of performing a correlation process of a specific positioning base code replica and a positioning base code and calculating a correlation value in units of first sampling phases which are phases at intervals of a first divided phase width which is a phase width obtained by equally dividing a phase range specified by a base unit of a positioning base code formed of a plurality of base units from a transmission source into at least three sections;

a first phase determination step of determining a first phase which is a sampling phase corresponding to the maximum correlation value;

a first positioning phase calculation step of calculating a first positioning phase used for positioning based on three consecutive first sampling phases including the first phase and the correlation values corresponding to the three consecutive first sampling phases including the first phase; and a first located position calculation step of calculating a present located position based on the first positioning phases corresponding to three or more of the transmission sources.

According to a further embodiment of the invention, there is provided a computer-readable recording medium having recorded thereon a positioning control program which causes a computer to execute:

a first correlation value calculation step of performing a correlation process of a specific positioning base code replica and a positioning base code and calculating a correlation value in units of first sampling phases which are phases at intervals of a first divided phase width which is a phase width obtained by equally dividing a phase range specified by a base unit of a positioning base code formed of a plurality of base units from a transmission source into at least three sections;

a first phase determination step of determining a first phase which is a sampling phase corresponding to the maximum correlation value;

a first positioning phase calculation step of calculating a first positioning phase used for positioning based on three consecutive first sampling phases including the first phase and the correlation values corresponding to the three consecutive first sampling phases including the first phase; and a first located position calculation step of calculating a present located position based on the first positioning phases corresponding to three or more of the transmission sources.

Preferred embodiments of the invention are described below in detail with reference to the drawings and the like.

The following embodiments illustrate specific preferred examples of the invention and are provided with various technologically preferred limitations. Note that the scope of the invention is not limited to these embodiments unless there is a description limiting the invention.

Two embodiment are generally described below. Each embodiment includes common items. Note that the common items are repeatedly described in order to clarify that the terminal according to each embodiment can be independently configured.

First Embodiment

FIG. 1 is a schematic view showing a terminal 1020 and the like according to a first embodiment.

As shown in FIG. 1, the terminal 1020 receives radio waves S1, S2, S3, and S4 from GPS satellites (positioning satellites) 12a, 12b, 12c, and 12d, for example. The radio waves S1 and the like exemplify a radio wave. The GPS satellites 12a and the like exemplify a transmission source.

Various codes are carried on the radio waves S1 and the like. A C/A code is one of such codes. The C/A code includes 1023 chips. The C/A code is a signal having a bit rate of 1.023 Mbps and a bit length of 1023 bits (=1 msec). The C/A code exemplifies a positioning base code. The terminal 1020 exemplifies a positioning device which locates the present position.

The terminal 1020 is provided in an automobile 1015, and locates the present position while being moved along with movement of the automobile 1015.

The terminal 1020 receives C/A codes from three or more different GPS satellites 12a and the like to locate the present position, for example.

The terminal 1020 determines the GPS satellite corresponding to the received C/A code. The terminal 1020 calculates the phase of the received C/A code (hereinafter called "code phase") by a correlation process. The terminal 1020 calculates the distance (hereinafter called "pseudo-range") between each of the GPS satellites 12a and the like and the terminal 1020 using the code phase. The terminal 1020 calculates (locates) the present position based on the position of each of the GPS satellites 12a and the like in the satellite orbit at the present time and the pseudo-range.

Since the C/A code is carried on the radio waves S1 and the like, the accuracy of the code phase calculated by the correlation process deteriorates if the reception frequency when the terminal 1020 receives the radio waves S1 and the like is inaccurate. Since the GPS satellites 12a and the like move in the satellite orbit, the reception frequency continuously changes. When the signal strength of the radio waves S1 and the like is high, the frequencies can be continuously synchronized by a PLL utilizing the radio waves S1 and the like.

However, the PLL does not effectively function when the signal strength of the radio waves S1 and the like is extremely low. Moreover, it is difficult to precisely estimate the IF carrier frequency of the radio waves S1 and the like when the signal strength of the radio waves S1 and the like is extremely low.

On the other hand, the terminal 1020 can accurately locate the present position as described below without estimating the IF carrier frequency when the signal strength of the radio waves S1 and the like is extremely low.

The terminal 1020 is a portable telephone, a personal handy-phone system (PHS), a personal digital assistance (PDA), or the like. Note that the terminal 1020 is not limited thereto.

The number of GPS satellites 12*a* and the like is not limited to four, and may be three or five or more.

(Main Hardware Configuration of Terminal 1020)

FIG. 2 is a schematic view showing the main hardware configuration of the terminal 1020.

As shown in FIG. 2, the terminal 1020 includes a computer, and the computer includes a bus 1022. A central processing unit (CPU) 1024, a storage device 1026, and the like are connected with the bus 1022. The storage device 1026 is a random access memory (RAM), a read-only memory (ROM), or the like.

An external storage device 1028 is also connected with the bus 1022. The external storage device 1028 is a hard disk drive (HDD) or the like.

A power supply device 1030, an input device 1032, a GPS device 1034, a display device 1047, and a clock 1048 are also connected with the bus 1022.

(Configuration of GPS Device 1034)

Figure 3:
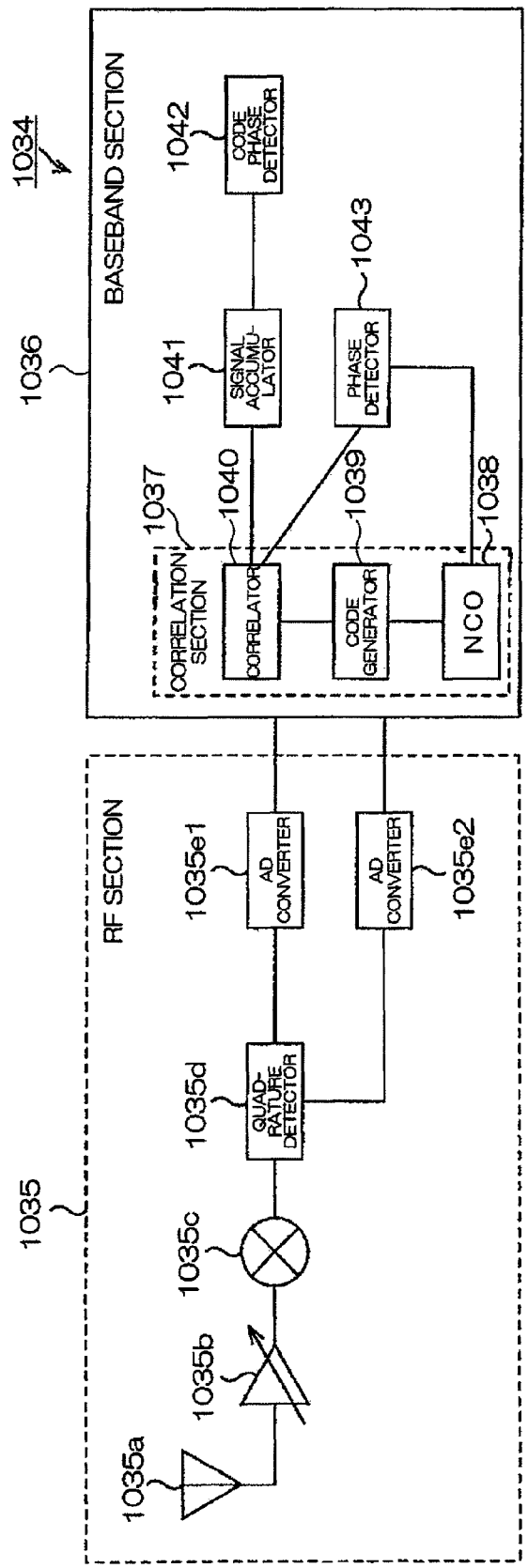
FIG. 3 is a schematic view showing the configuration of a GPS device according to the first embodiment.

FIG. 3 is a schematic view showing the configuration of the GPS device 1034.

As shown in FIG. 3, the GPS device 1034 includes an RF section 1035 and a baseband section 1036.

The RF section 1035 receives the radio waves S1 and the like through an antenna 1035*a*. An LNA 1035*b* (amplifier) amplifies the signal such as the C/A code carried on the radio wave S1. A mixer 1035*c* down-converts the frequency of the signal to the IF carrier frequency. A quadrature (IQ) detector 1035*d* separates the signal. AD converters 1035*e*1 and 1035*e*2 convert the separated signals into digital signals.

The baseband section 1036 receives the digitally-converted IF carrier frequency signals from the RF section 1035.

A correlation section 1037 of the baseband section 1036 performs a coherent process of synchronously accumulating the input digital signals over 10 milliseconds (ms) and correlating the accumulation result with the C/A code replica. The correlation section 1037 includes an NCO 1038, a code generator 1039, and a correlator 1040. The code generator 1039 generates the C/A code replica at the timing of a clock signal generated by the NCO 1038. The correlator 40 correlates the C/A code with the C/A code replica to determine the phase and calculate the correlation value. The frequency and the phase of the C/A code replica may be set in the correlation section 1037.

A signal accumulator 1041 performs an incoherent process of accumulating the correlation values output from the correlation section 1037.

A code phase detector 1042 detects the code phase from the value output from the correlation section 1037 and the value output from the signal accumulator 1041.

As described above, the correlation process is made up of the coherent process and the incoherent process.

The coherent process is a process in which the correlation section 1037 correlates the received C/A code with the C/A code replica.

For example, when the coherent time is 20 msec, the correlation value of the C/A code synchronously accumulated over 20 msec and the C/A code replica and the like are calculated. The correlated phase and the correlation value are output as a result of the coherent process.

The incoherent process is a process in which the incoherent value is calculated by accumulating the correlation values as the coherent results.

The phase output by the coherent process and the incoherent value are output as a result of the correlation process. The correlation value P is the incoherent value.

When the signal strength of the radio waves S1 and the like is sufficiently high, a phase detector 1043 can acquire phase information from the correlator 1040 and supply the phase information to the NCO 1038 to form a PLL. As a result, the C/A code replica can be generated at a frequency in synchronization with the IF carrier frequency. In more detail, the reception frequency is controlled so that the correlation value P is maximized.

The phase detector 1043, the correlator 1040, and the NCO 1038 exemplify a reception frequency control section.

(Main Software Configuration of Terminal 1020)

Figure 4:
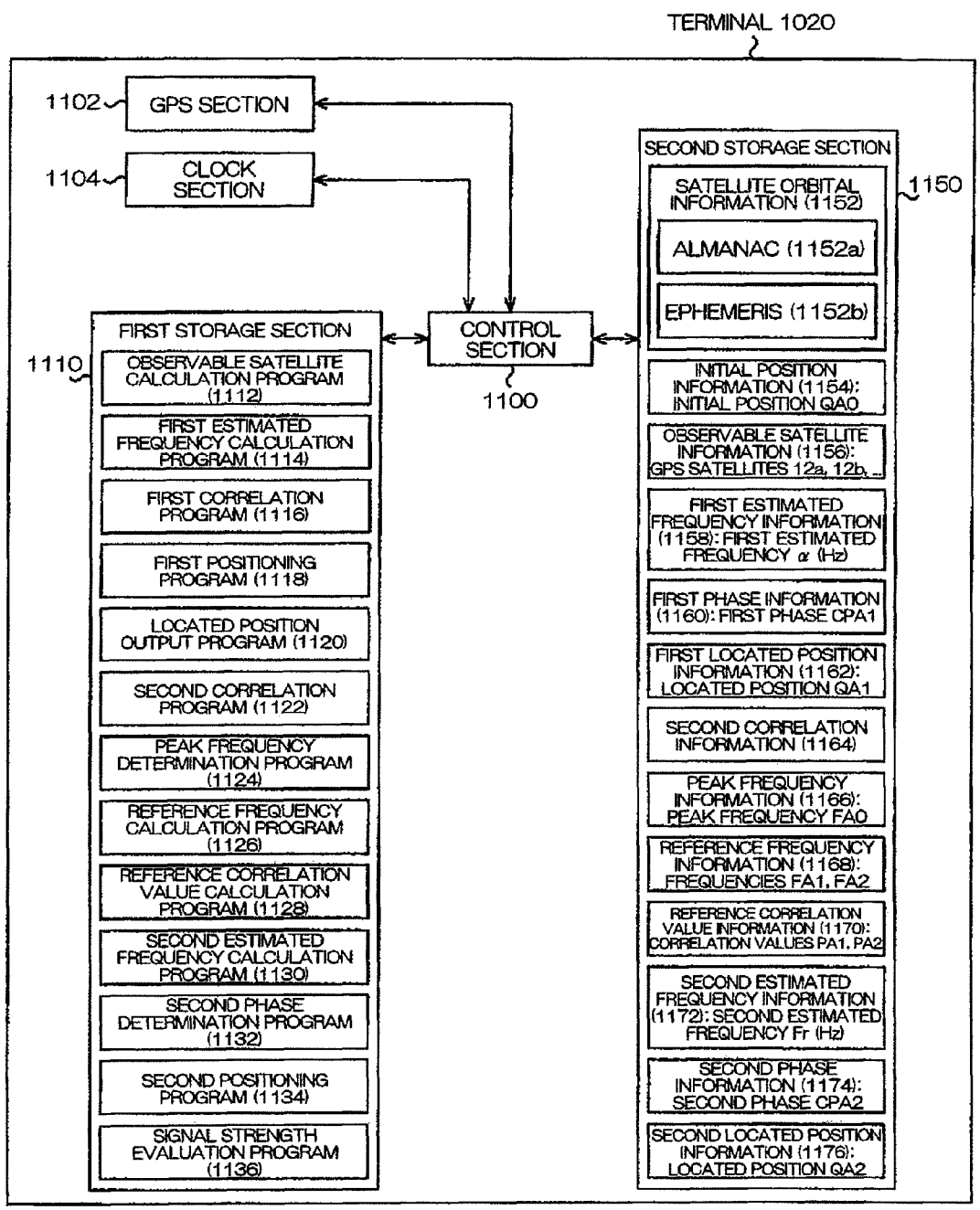
FIG. 4 is a schematic view showing the main software configuration of the terminal according to the first embodiment.

FIG. 4 is a schematic view showing the main software configuration of the terminal 1020.

As shown in FIG. 4, the terminal 1020 includes a control section 1100 which controls each section, a GPS section 1102 corresponding to the GPS device 1034 shown in FIG. 2, a clock section 1104 corresponding to the clock 1048, a first storage section 1110 which stores various programs, and a second storage section 1150 which stores various types of information.

As shown in FIG. 4, the terminal 1020 stores satellite orbital information 1152 in the second storage section 1150. The satellite orbital information 1152 includes an almanac 1152*a* and an ephemeris 1152*b*. The almanac 1152*a* is information indicating the approximate orbits of all of the GPS satellites 12*a* and the like. The ephemeris 1152*b* is information indicating the precise orbit of each of the GPS satellites 12*a* and the like.

The terminal 1020 uses the almanac 1152*a* and the ephemeris 1152*b* for positioning.

As shown in FIG. 4, the terminal 1020 stores initial position information 1154 in the second storage section 1150. The initial position information 1154 is information indicating the present initial position P0 of the terminal 1020. The initial position QA0 is the preceding located position, for example.

As shown in FIG. 4, the terminal 1020 stores an observable satellite calculation program 1112 in the first storage section 1110. The observable satellite calculation program 1112 is a program for causing the control section 1100 to generate observable satellite information 1156 indicating the GPS satellites 12*a* and the like which can be observed from the initial position QA0 at the present time measured by the clock section 1104 referring to the almanac 1152*a*.

The control section 1100 stores the generated observable satellite information 1156 in the second storage section 1150.

As shown in FIG. 4, the terminal 1020 stores a first estimated frequency calculation program 1114 in the first storage section 1110. The first estimated frequency calculation program 1114 is a program for causing the control section 1100 to calculate a first estimated frequency α which is an estimated value of the IF carrier frequency of each of the radio waves S1 and the like. The first estimated frequency α is an estimated value of the IF carrier frequency of the radio wave S1 when the terminal 1020 receives the radio wave S1 from the GPS satellite 12*a* at the present time, for example.

FIG. 5 is a view illustrative of the first estimated frequency calculation program 1114.

As shown in FIG. 5, the first estimated frequency α is a frequency obtained by adding a Doppler shift H2 to a transmission frequency H1. The transmission frequency H1 is a known value determined by the frequency (e.g. 1.5 GHz) when the radio waves S1 and the like are transmitted from the GPS satellites 12a and the like and the downconversion rate of the mixer 35c. The Doppler shift H2 is a frequency shift caused by the relative movement of the GPS satellites 12a and the like and the terminal 1020, and always changes. The Doppler shift H2 may be calculated from the initial position P0 of the terminal 1020 and the ephemeris 1152b.

The control section 1100 stores first estimated frequency information 1158 indicating the first estimated frequency α in the second storage section 1150.

However, since the position of the terminal 1020 is the initial position QA0 instead of the accurate present position, and the GPS satellites 12a and the like and the terminal 1020 always move relatively, the calculated Doppler shift H1 may differ from the true Doppler shift.

Therefore, the first estimated frequency α generally differs from the true IF carrier frequency.

As shown in FIG. 4, the terminal 1020 stores a first correlation program 1116 in the first storage section 1110. The first correlation program 1116 is a program for causing the control section 1100 to calculate the correlation value of the C/A code received from the GPS satellites 12a and the like and the C/A code replica, and calculate a first phase CPA1 which is the phase (code phase) of the C/A code.

The first phase CPA1 is the phase of the C/A code and is also the phase of the C/A code replica.

Figure 6A:
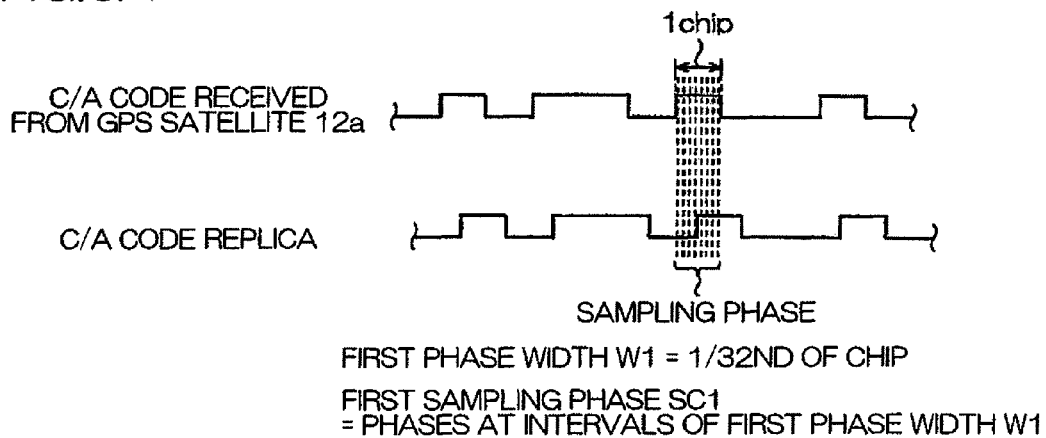
FIG. 6A is a view illustrative of the process of a first correlation program according to the first embodiment.
Figure 6B:
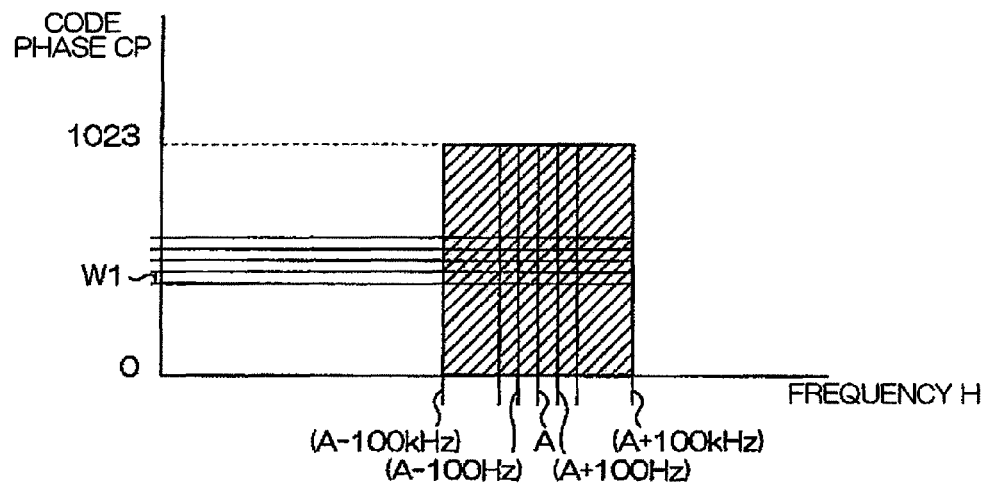
FIG. 6B is a view illustrative of a correlation process.
Figure 6C:
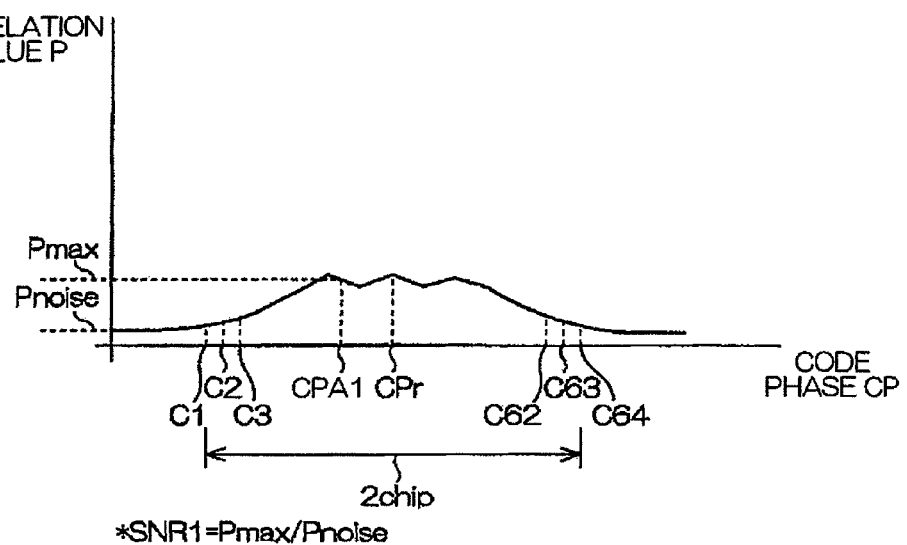
FIG. 6C is a view illustrative of the relationship between a phase and a correlation value.

FIG. 6A, FIG. 6B and FIG. 6C are views illustrative of the first correlation program 1116.

As shown in FIG. 6A, the control section 1100 equally divides one chip of the C/A code using the baseband section 1036, and performs the correlation process, for example. One chip of the C/A code is equally divided into 32 sections, for example. Specifically, the control section 1100 performs the correlation process at intervals of the phase width of 1/32nd of a chip (first phase width W1). The phases at intervals of the first phase width W1 when the control section 1100 performs the correlation process are called first sampling phases SC1.

The first phase width W1 is specified as a phase width which allows detection of the maximum correlation value Pmax when the strength of the signal input to the antenna 1035a is –155 dBm or more. A simulation revealed that the maximum correlation value Pmax can be detected when the signal strength is –155 dBm or more by using a phase width of 1/32nd of a chip, even if the electric field is weak.

As shown in FIG. 6B, the control section 1100 performs the correlation process while changing the frequency in 100 Hz units within the range of the estimated frequency α±100 kHz. The control section 1100 changes the code phase CP by the first phase width W1 in frequency units, and identifies the frequency and the code phase which allow calculation of the maximum correlation value Pmax.

The control section 1100 changes the C/A code replica from the chip 0 to the chip 1023 when starting positioning.

When the control section 1100 has determined the code phase and the frequency corresponding to the maximum correlation value Pmax, the control section 1100 searches for the signals S1 and the like around the code phase and the frequency corresponding to the maximum correlation value Pmax within a range smaller than that when starting positioning. For example, the control section 1100 searches for the signals S1 and the like within the phase range of ±256 chips around the first positioning phase CPA1 which has been calculated. The control section 1100 searches for the frequency in 100 Hz units within the range of ±1.0 kHz around the frequency corresponding to the maximum correlation value Pmax. This condition is called a first tracking condition.

As shown in FIG. 6C, the correlation values P corresponding to phases C1 to C64 of two chips are output from the baseband section 1036. Each of the phases C1 to C64 is the first sampling phase SC1.

The ratio of the correlation value Pmax to the correlation value Pnoise is called a ratio SNR. The correlation value Pnoise is the signal level of ambient noise. The correlation value Pmax is the signal level from the GPS satellites 12a and the like.

The ratio SNR1 shown in FIG. 6C is relatively small in a state in which the strength of the signals S1 and the like is low.

The control section 1100 determines the first phase CPA1 corresponding to the correlation value Pmax.

The control section 1100 stores first phase information 1160 indicating the first phase CPA1 in the second storage section 1150.

The smaller the ratio SNR1, the lower the accuracy of the first phase CPA1.

The operation of the terminal 1020 based on the first correlation program 1116 is called a first correlation process.

As shown in FIG. 4, the terminal 1020 stores a first positioning program 1118 in the first storage section 1110. The first positioning program 1118 is a program for causing the control section 1100 to locate the present position based on the first phases CPA1 corresponding to three or more GPS satellites 12a and the like and calculate the located position QA1.

Figure 7:
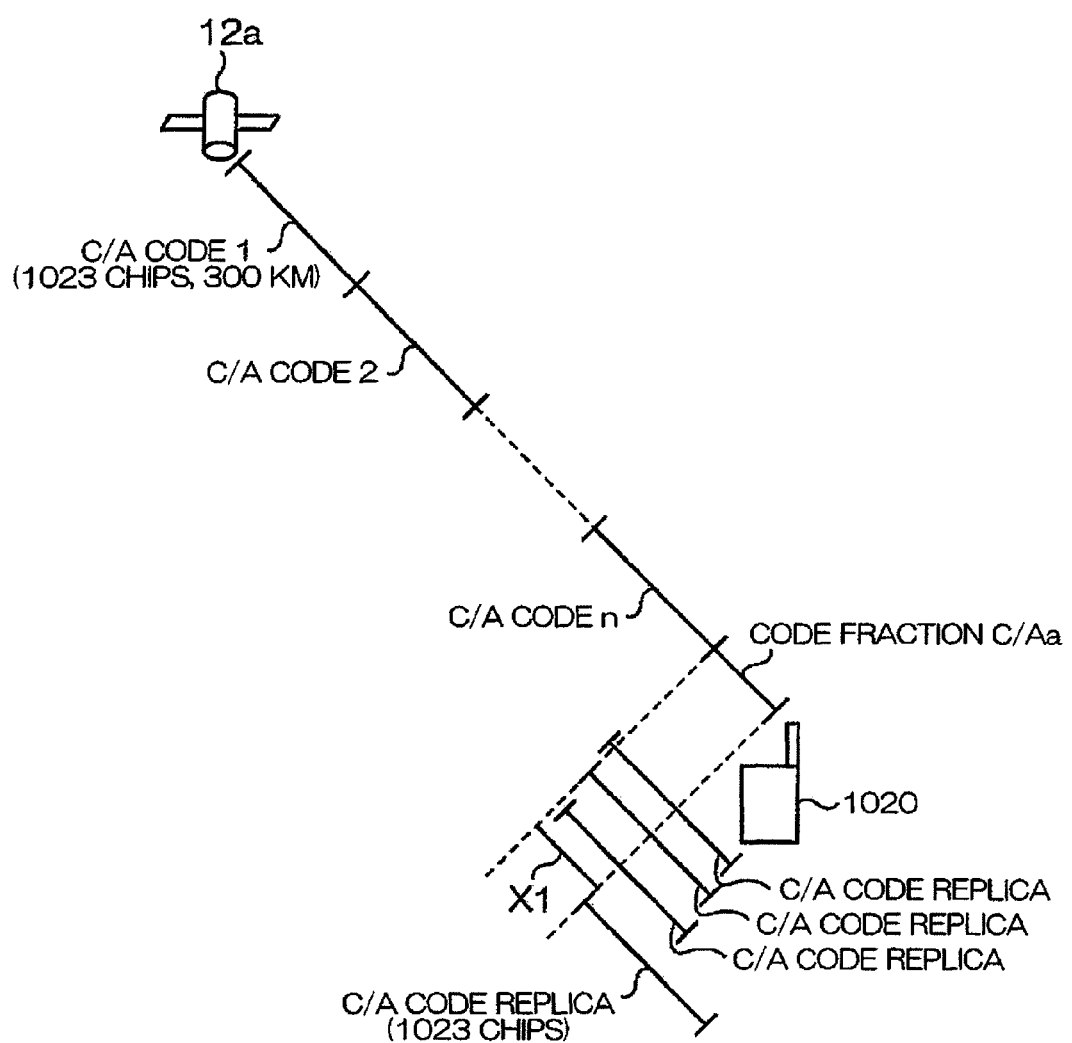
FIG. 7 is a schematic view showing a positioning method according to the first embodiment.

FIG. 7 is a schematic view showing a positioning method.

As shown in FIG. 7, it may be considered that a plurality of C/A codes continuously line up between the GPS satellite 12a and the terminal 1020, for example. Since the distance between the GPS satellite 12a and the terminal 1020 is not necessarily a multiple of the length of the C/A code, a code fraction C/Aa exists. Specifically, a portion of a multiple of the C/A code (portion in which n (n is an integer) C/A codes line up) and a fraction portion (code fraction C/Aa) exist between the GPS satellite 12a and the terminal 1020. The total length of the portion of a multiple of the C/A code and the code fraction C/Aa is the pseudo-range. The terminal 1020 locates the position using the pseudo-range.

The position of the GPS satellite 12a in the orbit can be calculated using the ephemeris 1152b. The portion of a multiple of the C/A code can be specified by calculating the distance between the position of the GPS satellite 12a in the orbit and the initial position QA0.

As shown in FIG. 7, the correlation process is performed while moving the phase of the C/A code replica in the direction indicated by X1, for example.

The phase of which the correlation value becomes maximum is the code fraction C/Aa. The code fraction C/Aa is the first phase CPA1.

The control section 1100 calculates the pseudo-range between each of the GPS satellites 12a and the like and the terminal 1020 based on the first phases CPA1 corresponding to three or more GPS satellites 12a and the like. The position of each of the GPS satellites 12a and the like in the orbit is calculated using the ephemeris 1152b. The control section 1100 locates the present position based on the position of each of three or more GPS satellites 12a and the like in the orbit and the pseudo-range, and calculates the located position QA1.

The control section 1100 stores first located position information 1162 indicating the located position QA1 in the second storage section 1150.

As shown in FIG. 4, the terminal 1020 stores a located position output program 1120 in the first storage section 1110. The located position output program 1120 is a program for causing the control section 1100 to display the located position QA1 or a located position QA2 described later on the display device 1047.

As shown in FIG. 4, the terminal 1020 stores a second correlation program 1122 in the first storage section 1110. The second correlation program 1122 is a program for causing the control section 1100 to perform the correlation process to calculate the correlation value P and the code phase CP.

The control section 1100 stores second correlation information 1164 indicating the correlation value P and the code phase CP in the second storage section 1150.

As shown in FIG. 4, the terminal 1020 stores a peak frequency determination program 1124 in the first storage section 1110. The peak frequency determination program 1124 and the control section 1100 exemplify a peak frequency determination section.

Figure 8:
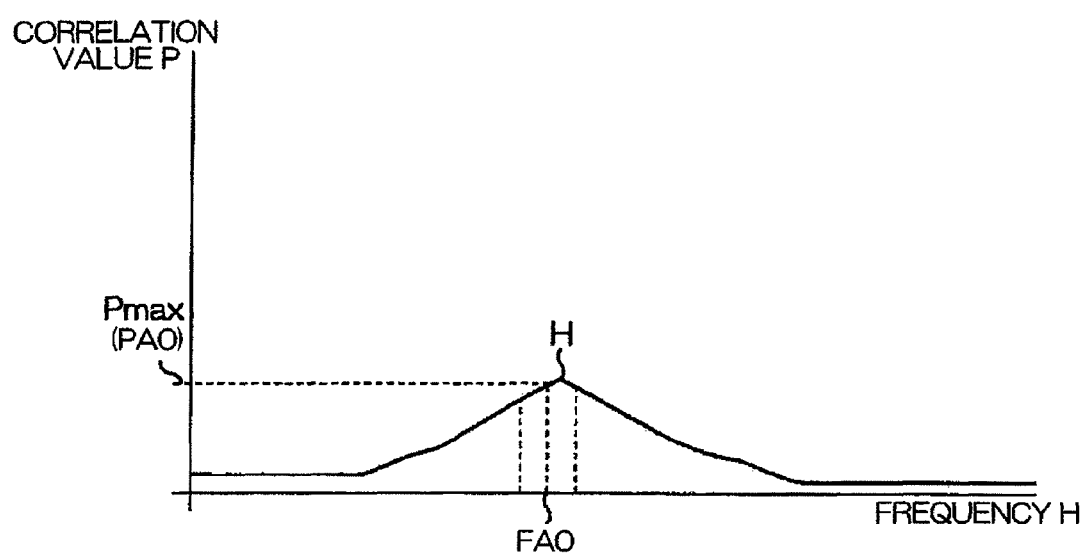
FIG. 8 is a view illustrative of a peak frequency determination program according to the first embodiment.

FIG. 8 is a view illustrative of the peak frequency determination program 1124.

As shown in FIG. 8, the control section 1100 determines the frequency corresponding to the maximum correlation value Pmax as a peak frequency FA0. The peak frequency FA0 exemplifies a peak frequency.

Since the peak frequency FA0 is obtained by causing the terminal 1020 to search for the frequency at intervals of 100 Hz, the peak frequency FA0 differs from the true IF carrier frequency of the received radio waves S1 and the like by about 50 Hz or less.

The control section 1100 stores peak frequency information 1166 indicating the peak frequency FA0 in the second storage section 1150.

As shown in FIG. 4, the terminal 1020 stores a reference frequency calculation program 1126 in the first storage section 1110. The reference frequency calculation program 1126 and the control section 1100 exemplify a reference frequency calculation section.

The control section 1100 calculates a frequency FA1 lower than the peak frequency FA0 by 100 Hz and a frequency FA2 higher than the peak frequency FA0 by 100 Hz based on the reference frequency calculation program 1126. The control section 1100 stores reference frequency information 1168 indicating the frequency FA1 and the frequency FA2 in the second storage section 1150. The frequency FA1 exemplifies a low frequency. The frequency FA2 exemplifies a high frequency.

The frequency FA1 and the frequency FA1 are determined so that the difference between the peak frequency FA0 and the frequency FA1 becomes equal to the difference between the peak frequency FA0 and the frequency FA2. In the first embodiment, the difference in frequency is set at 100 Hz.

Note that the difference in frequency is not limited to 100 Hz.

As shown in FIG. 4, the terminal 1020 stores a reference correlation value calculation program 1128 in the first storage section 1110. The reference correlation value calculation program 1128 and the control section 1100 exemplify a reference correlation value calculation section.

The control section 1100 calculates a correlation value PA1 corresponding to the frequency FA1 and a correlation value PA2 corresponding to the frequency FA2 based on the reference correlation value calculation program 1128. In more detail, the control section 1100 calculates the correlation value PA1 and the correlation value PA2 referring to the second correlation information 1164.

The control section 1100 stores reference correlation value information 1170 indicating the correlation value PA1 and the correlation value PA2 in the second storage section 1150.

As shown in FIG. 4, the terminal 1020 stores a second estimated frequency calculation program 1130 in the first storage section 110. The second estimated frequency calculation program 1130 is a program for causing the control section 1100 to calculate a second estimated frequency Fr based on the peak frequency FA0, the correlation peak value Pmax (PA0), the frequency FA1, the correlation value PA1, the frequency FA2, and the correlation value PA2. The second estimated frequency Fr exemplifies a corrected peak frequency. The second estimated frequency calculation program 1130 and the control section 1100 exemplify a corrected peak frequency calculation section.

FIG. 9A, FIG. 9B, FIG. 10A and FIG. 10B are views illustrative of the second estimated frequency calculation program 1130.

As shown in FIG. 9A, FIG. 9B, FIG. 10A and FIG. 10B, a graph indicating the correlation value P and the frequency F forms an isosceles triangle.

Figure 9A:
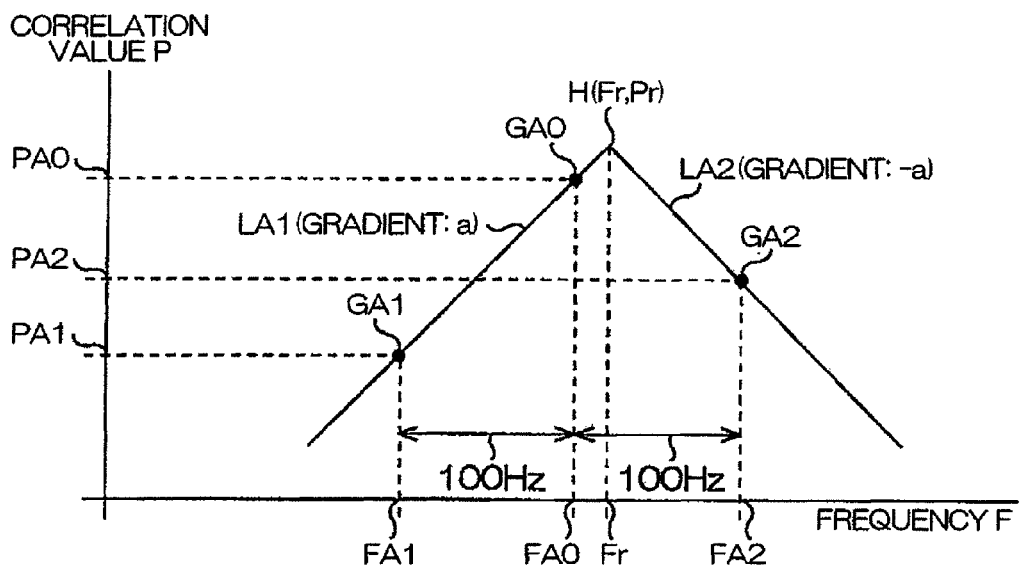
FIG. 9A is a view showing the relationship between a frequency and a correlation value which is illustrative of a second estimated frequency calculation program according to the first embodiment.
Figure 10A:
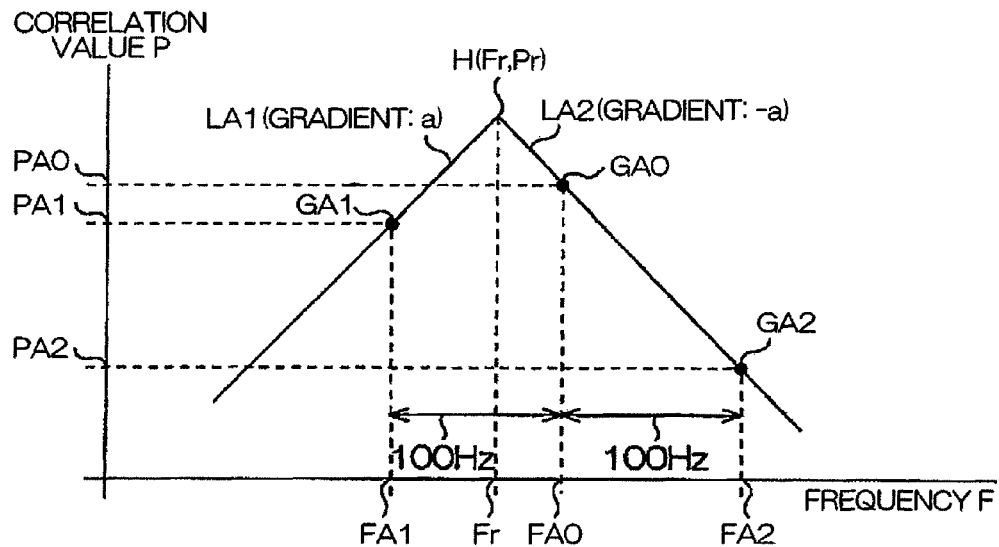
FIG. 10A is a view showing the relationship between a frequency and a correlation value which is illustrative of a second estimated frequency calculation program according to the first embodiment.

As shown in FIGS. 9A and 10A, a point GA0 is specified by the peak frequency FA0 and the correlation peak value PA0. A point GA1 is specified by the frequency FA1 and the correlation value PA1. A point GA2 is specified by the frequency FA2 and the correlation value PA2.

Figure 9B:
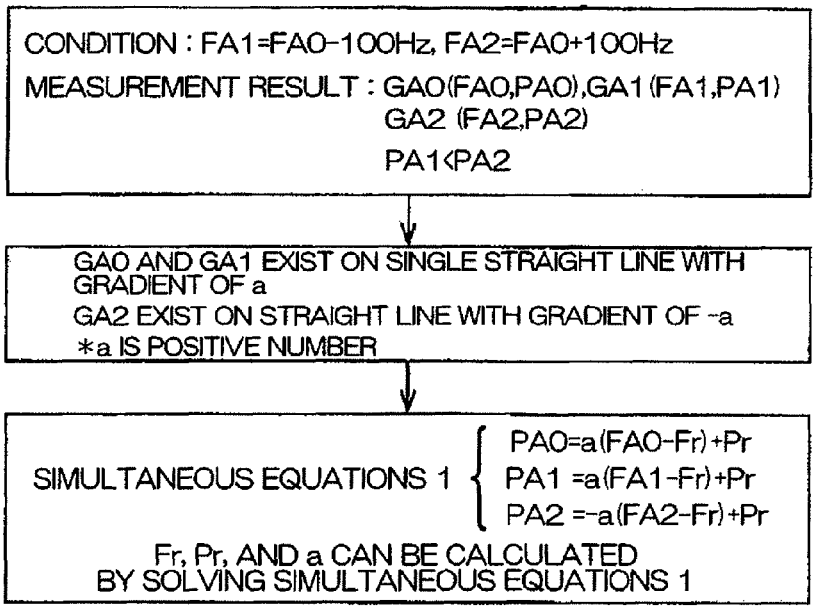
FIG. 9B is a view illustrative of the process of a second estimated frequency calculation program.

As shown in FIGS. 9A and 9B, when the correlation value PA 1 is smaller than the correlation value PA2, the point GA0 and the point GA1 exist on a single straight line with a gradient of a (a is a positive number). The straight line connecting the point GA0 and the point GA1 is a straight line LA1.

The point GA2 exists on a straight line with a gradient of −a. The straight line having a gradient of −a and passing through the point GA2 is a straight line LA2.

The intersection of the straight line LA1 and the straight line LA2 is the vertex H of the isosceles triangle. The frequency corresponding to the vertex H is the second estimated frequency Fr. The unknown numbers Fr and Pr and the gradient a can be calculated by solving the simultaneous equations 1 shown in FIG. 9B.

Figure 10B:
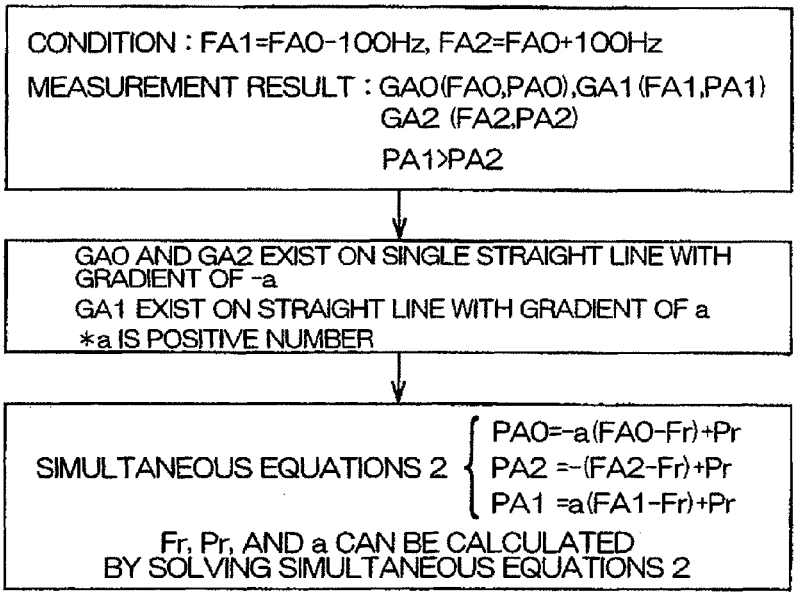
FIG. 10B is a view illustrative of the process of the second estimated frequency calculation program.

As shown in FIGS. 10A and 10B, when the correlation value PA1 is greater than the correlation value PA2, the point GA0 and the point GA2 exist on a single straight line with a gradient of −a (a is a positive number). The straight line connecting the point GA0 and the point GA2 is a straight line LA2.

The point GA1 exists on a straight line with a gradient a. The straight line having a gradient of a and passing through the point GA1 is a straight line LA1.

The intersection of the straight line LA1 and the straight line LA2 is the vertex H of the isosceles triangle. The frequency corresponding to the vertex H is the second estimated frequency Fr. The unknown numbers Fr and Pr and the gradient a can be calculated by solving the simultaneous equations 2 shown in FIG. 10B.

When the correlation value PA1 is equal to the correlation value PA2, the peak frequency FA0 is the second estimated frequency Fr.

The control section 1100 stores second estimated frequency information 1172 indicating the second estimated frequency Fr in the second storage section 1150.

Since the second estimated frequency Fr is not affected by a limitation of 100 Hz which is the search step for the frequency F, the second estimated frequency Fr is information with high accuracy. Specifically, the second estimated frequency Fr is closer to the true IF carrier frequency than the peak frequency FA0.

As shown in FIG. 4, the terminal 1020 stores a second phase determination program 1132 in the first storage section 1110. The second phase determination program 1132 is a program for causing the control section 1100 to receive the radio waves S1 and the like using the second estimated frequency Fr, perform the correlation process, and calculate a second phase CPA2 for positioning. The second phase determination program 1132 and the control section 1100 exemplify a radio wave reception section.

Figure 11:
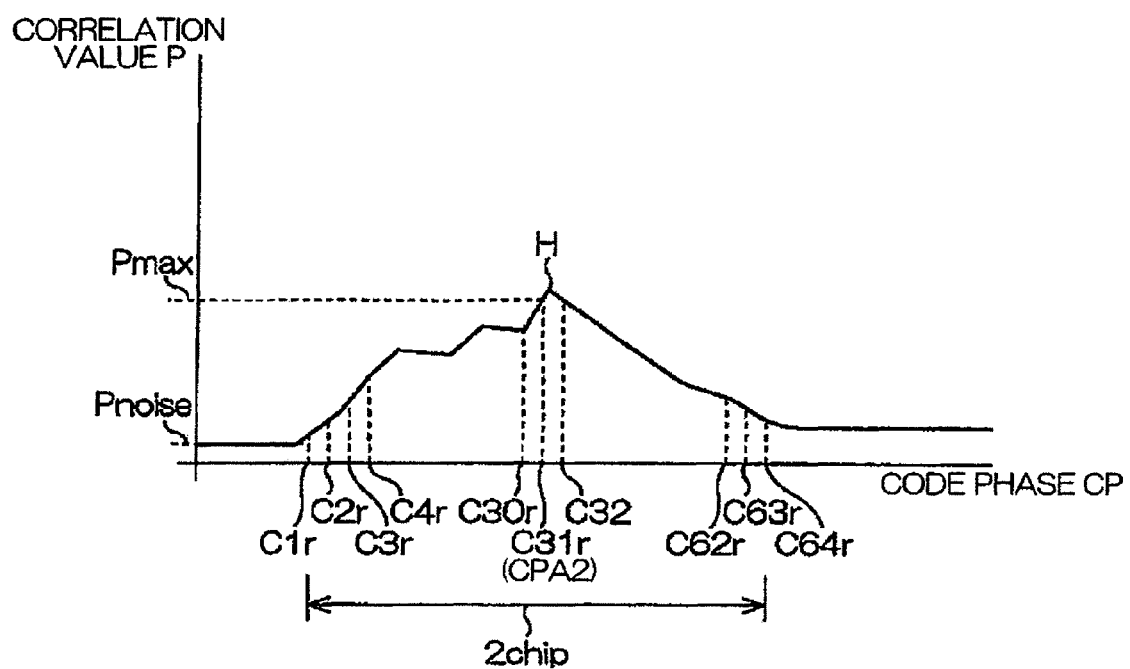
FIG. 11 is a view illustrative of a second phase determination program according to the first embodiment.

FIG. 11 is a view illustrative of the second phase determination program 1132.

The ratio SNR2 in the correlation graph shown in FIG. 11 is greater than the ratio SNR1 in the graph shown in FIG. 6C. This is because the second estimated frequency Fr is very close to the true IF carrier frequency.

Therefore, the second phase CPA2 which is the phase corresponding to the maximum correlation value Pmax is phase information with high accuracy.

The control section 1100 stores second phase information 1174 indicating the second phase CPA2 in the second storage section 1150.

The operation of the terminal 1020 based on the second correlation program 1122, the peak frequency determination program 1124, the reference frequency calculation program 1126, the reference correlation value calculation program 1128, the second estimated frequency calculation program 1130, and the second phase determination program 1132 is called a second correlation process.

As shown in FIG. 4, the terminal 1020 stores a second positioning program 1134 in the first storage section 110. The second positioning program 1134 is a program for causing the control section 1100 to locate the position based on the second phases CPA2 for three or more GPS satellites 12a and the like and calculate the located position QA2.

The control section 1100 stores second located position information 1176 indicating the located position QA2 in the second storage section 1150.

As shown in FIG. 4, the terminal 1020 stores a signal strength evaluation program 1136 in the first storage section 1110.

The signal strength evaluation program 1136 is a program for evaluating the strength SP of the signal input to the antenna 1035a. The strength SP of the signal input to the antenna 1035a may be estimated from the correlation value.

The control section 1100 performs the first correlation process when the signal strength SP is −138 dBm or more, and calculates the located position QA1.

The control section 1100 performs the second correlation process when the signal strength SP is −142 dBm or less, and calculates the located position QA2.

The control section 1100 performs the first correlation process and the second correlation process in parallel when the signal strength SP is −142 dBm or more and less than −138 dBm. The control section 1100 calculates the located position QA1 using the first phase CPA1.

The terminal 1020 is configured as described above.

The terminal 1020 can determine the peak frequency FA0 (see FIG. 4), as described above.

The terminal 1020 can calculate the second estimated frequency Fr (see FIG. 4).

When the phase of the C/A code replica is fixed, the graph indicating the relationship between the correlation value and the reception frequency (IF carrier frequency) forms an isosceles triangle having a point corresponding to the maximum correlation value as the vertex, as shown in FIG. 9A and FIG. 9B. The point GA0 corresponding to the peak frequency FA0 is positioned near the vertex H, and the points GA1 and GA2 respectively corresponding to the frequencies FA1 and FA2 lower or higher than the peak frequency FA0 are positioned on different oblique sides. Since one of the points GA1 and GA2 is positioned on the same oblique side as the point GA1, the gradient a of the oblique side can be determined. If the gradient of one oblique side of the isosceles triangle can be determined, the gradient of the other oblique side can also be determined. The intersection of the two oblique sides is the vertex H. The frequency corresponding to the vertex H is the second estimated frequency Fr.

When the signal strength of the radio waves S1 and the like is extremely low, one peak frequency FA0 necessarily exists even if the estimated IF carrier frequency cannot be determined, as described above. The second estimated frequency Fr can be calculated by determining the peak frequency FA0.

The terminal 1020 can receive the radio waves S1 and the like using the second estimated frequency Fr. Therefore, the correlation value P can be accurately calculated, whereby the present position can be accurately calculated.

This makes it possible to accurately locate the position without determining the IF carrier frequency when the signal strength of the satellite radio wave is extremely low.

The terminal 1020 can control the reception frequency using the PLL so that the coherent value of the C/A code replica and the received C/A code is maximized.

This makes it possible to cause the PLL to effectively function when the signal strength of the radio waves S1 and the like is within a specific range, whereby the reception frequency can be continuously brought close to the IF carrier frequency of the radio waves S1 and the like.

The terminal 1020 can perform the first correlation process and the second correlation process in parallel when the signal strength of the radio waves S1 and the like is within a specific range. Therefore, the position can be continuously and accurately located when the signal strength SP has transitioned from a value greater than a specific strength to a value smaller than the specific strength.

The configuration of the terminal 1020 according to the first embodiment has been described above. An operation example of the terminal 1020 is described below mainly using FIGS. 12 and 13.

Figure 12:
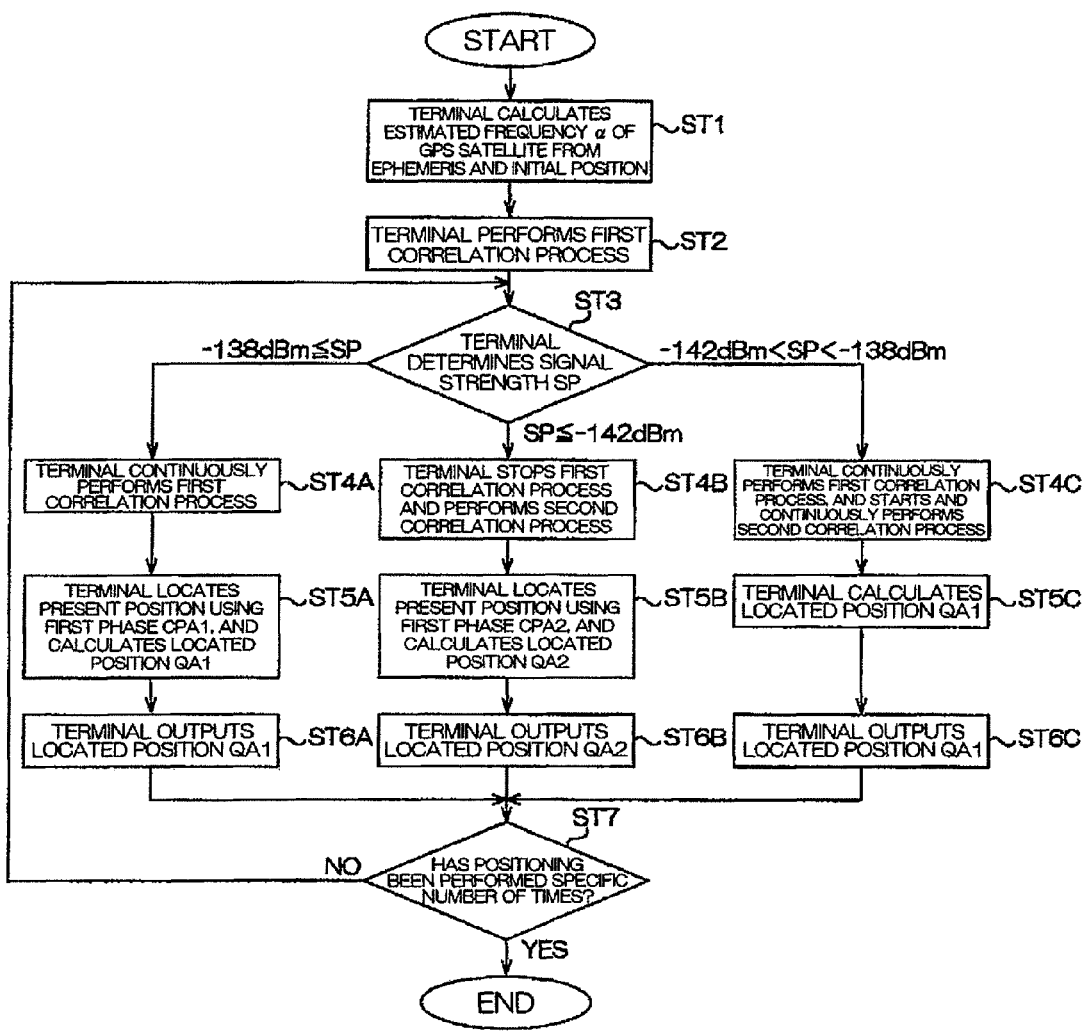
FIG. 12 is a schematic flowchart showing an operation example of the terminal according to the first embodiment.
Figure 13:
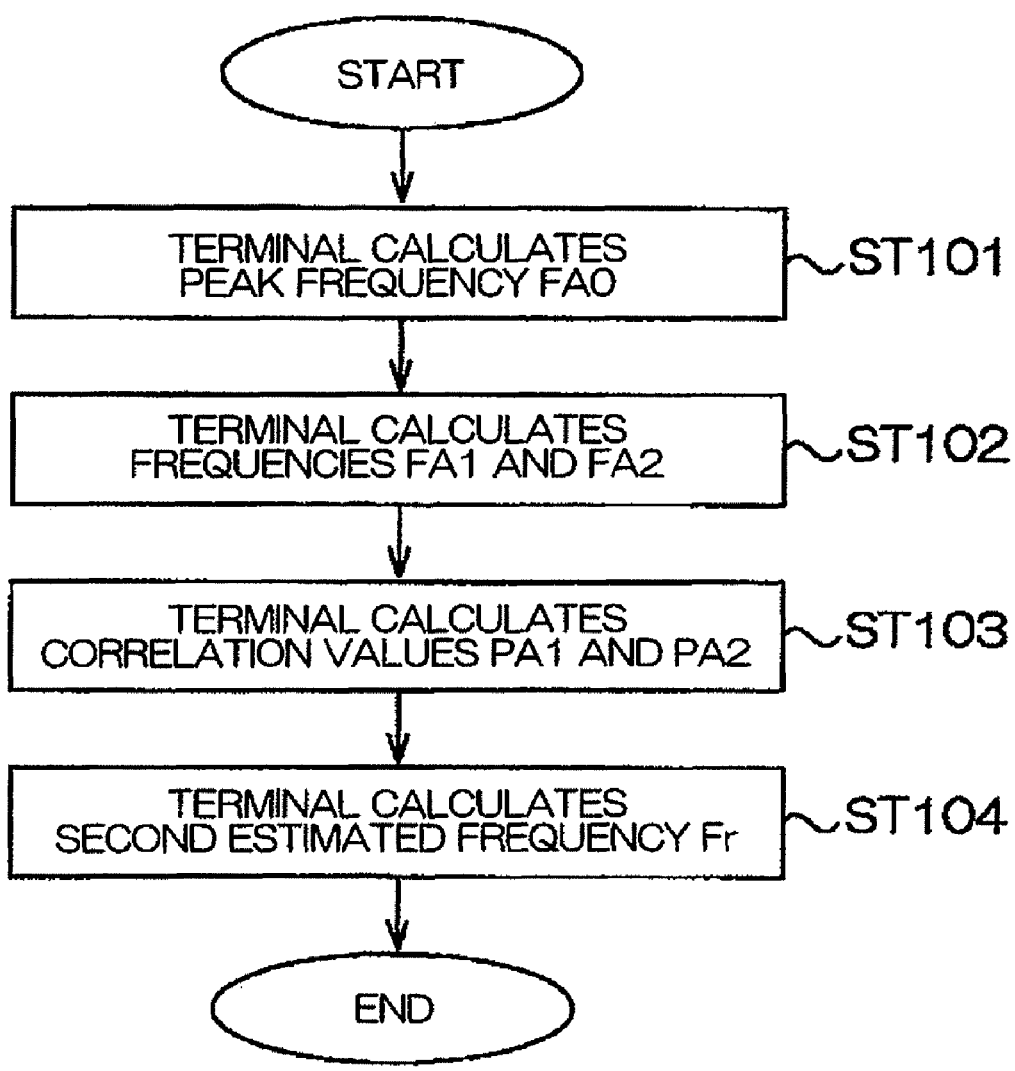
FIG. 13 is a schematic flowchart showing an operation example of the terminal according to the first embodiment.

FIGS. 12 and 13 are schematic flowcharts showing an operation example of the terminal 1020.

The terminal 1020 calculates the estimated frequency α of each of the GPS satellites 12a and the like from the ephemeris 1152b and the initial position QA0 (step ST1 in FIG. 12).

The terminal 1020 performs the first correlation process (step ST2).

The terminal 20 determines the signal strength SP (step ST3).

When the terminal 1020 has determined that the signal strength SP is −138 dBm or more in the step ST3, the terminal 1020 continuously performs the first correlation process (step ST4A). The terminal 1020 locates the present position using the first phase CPA1, and calculates the located position QA1 (step ST5A).

The terminal 1020 outputs the located position QA1 (step ST6A).

The terminal 1020 determines whether or not positioning has been performed a specific number of times (e.g. 10 times) (step ST7).

When the terminal 1020 has determined that positioning has been performed a specific number of times, the terminal 1020 finishes the positioning operation.

When the terminal 1020 has determined that positioning has not been performed a specific number of times, the terminal 1020 executes the step ST3 and the subsequent steps.

When the terminal 1020 has determined that the signal strength SP is −142 dBm or less in the step ST3, the terminal 1020 stops the first correlation process, and performs the second correlation process (step ST4B).

In the second correlation process, the terminal 1020 determines the peak frequency FA0 (see FIG. 4) (step ST101 in FIG. 13). The step ST101 exemplifies a peak frequency determination step.

The terminal 1020 calculates the frequencies FA1 and FA2 (see FIG. 4) (step ST102). The step ST102 exemplifies a reference frequency calculation step.

The terminal 1020 calculates the correlation values PA1 and PA2 (see FIG. 4) (step ST103). The step ST103 exemplifies a reference correlation value calculation step.

The terminal 1020 calculates the second estimated frequency Fr (see FIG. 4) (step ST104). The step ST104 exemplifies a corrected peak frequency calculation step.

The terminal 1020 calculates the second phase CPA2, locates the present position using the second phase CPA2, and calculates the located position QA2 (step ST5B in FIG. 12).

The terminal 1020 outputs the located position QA2 (step ST6B), and executes the step ST7.

When the terminal 1020 has determined that the signal strength SP is more than −142 dBm and less than −138 dBm in the step ST3, the terminal 1020 performs the first correlation process and the second correlation process in parallel (step ST4C in FIG. 12).

The terminal 1020 locates the present position using the first phase CPA1, and calculates the located position QA1 (step ST5C).

The terminal 1020 outputs the located position QA1 (step ST6C), and executes the step ST7.

When the terminal 1020 has determined that positioning has not been performed a specific number of times, the terminal 1020 executes the step ST3 and the subsequent steps. When the terminal 1020 has determined that the signal strength SP is −138 dBm or less in the step ST3, the terminal 1020 executes the step ST4B. Since the terminal 1020 continuously performs the first correlation process and the second correlation process in parallel, the terminal 1020 can stop the first correlation process and immediately perform the second correlation process. This means that the second correlation process is continuously performed in an intermediate state in which the signal strength SP may decrease to −142 dBm or less (state in which the signal strength SP is more than −142 dBm and less than −138 dBm) instead of starting the second correlation process after the PLL has not functioned in the first correlation process. Therefore, since it is unnecessary to again search for the frequency and the phase over a wide range in the second correlation process, the step ST5B and the subsequent steps can be promptly executed.

The intermediate state (state in which the signal strength SP is more than −142 dBm and less than −138 dBm) is also a state in which the signal strength SP may increase to −138 dBm or more. It is possible to immediately transition to a state in which only the first correlation process is executed when the signal strength has increased to −138 dBm or more by continuously performing the first correlation process in advance.

Second Embodiment

Figure 14:
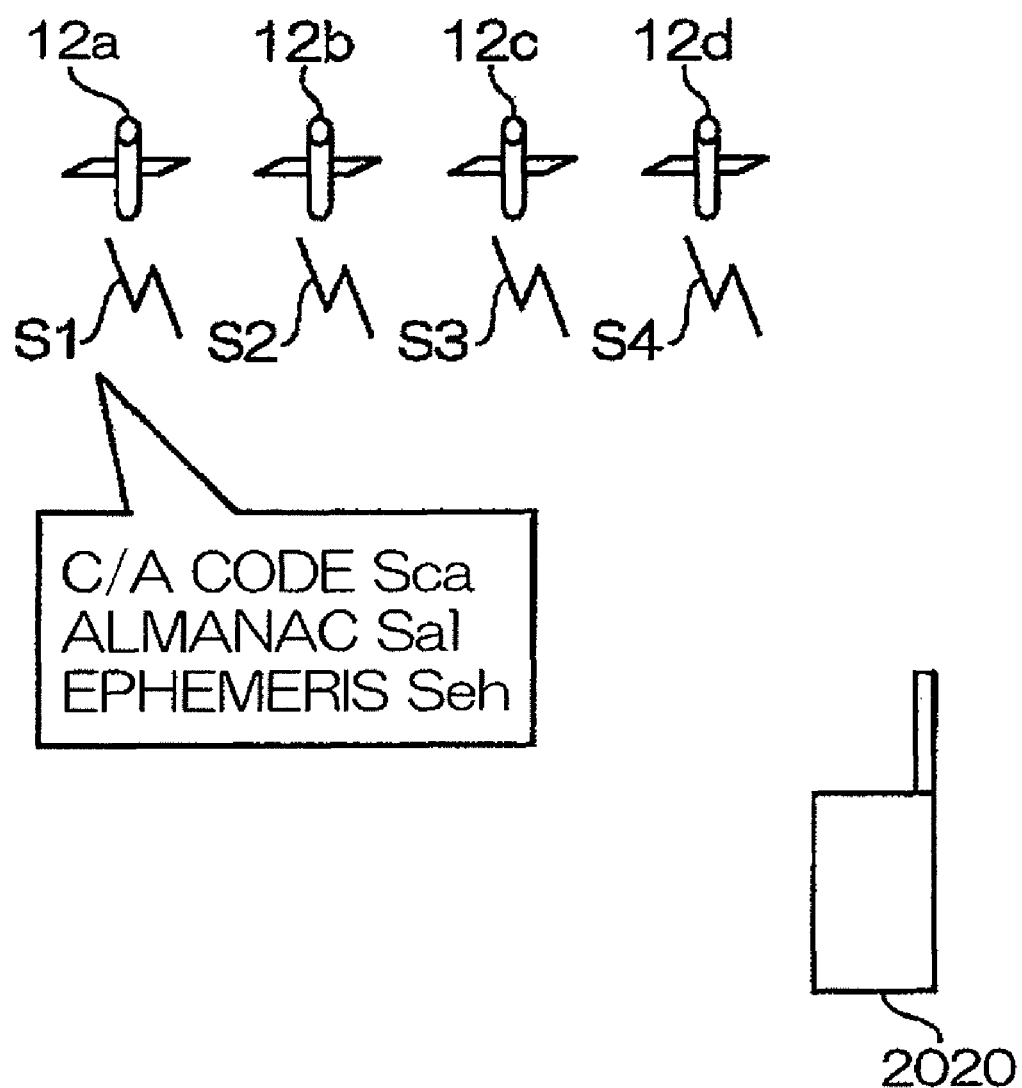
FIG. 14 is a schematic view showing a terminal and the like according to a second embodiment.

FIG. 14 is a schematic view showing a terminal 2020 and the like according to a second embodiment.

As shown in FIG. 14, the terminal 2020 receives radio waves S1, S2, S3, and S4 from GPS satellites (positioning satellites) 12*a*, 12*b*, 12*c*, and 12*d*, for example. The GPS satellites 12*a* and the like exemplify a transmission source.

Various codes are carried on the radio waves S1 and the like. A C/A code Sca is one of such codes. The C/A code Sca is a signal having a bit rate of 1.023 Mbps and a bit length of 1023 bits (=1 msec). The C/A code Sca includes 1023 chips. The terminal 2020 exemplifies a positioning device which locates the present position, and locates the present position using the C/A code. The C/A code Sca exemplifies a positioning base code. The chip exemplifies a base unit.

As information carried on the radio waves S1 and the like, an almanac Sal and an ephemeris Seh can be given. The almanac Sal is information indicating the approximate satellite orbits of all of the GPS satellites 12*a* and the like, and the ephemeris Seh is information indicating the precise satellite orbit of each of the GPS satellites 12*a* and the like. The almanac Sal and the ephemeris Seh are generically called a navigation message.

The terminal 2020 receives C/A codes from three or more different GPS satellites 12*a* and the like to locate the present position, for example.

The terminal 2020 determines the GPS satellite corresponding to the received C/A code. The terminal 2020 calculates the distance (hereinafter called "pseudo-range") between each of the GPS satellites 12*a* and the like and the terminal 2020 by determining the phase of the C/A code. The terminal 2020 calculates (locates) the present position based on the position of each of the GPS satellites 12*a* and the like in the satellite orbit at the present time and the pseudo-range.

The terminal 2020 performs a coherent process and an incoherent process described later in order to determine the phase of the C/A code.

Note that the terminal 2020 may locate the position using a radio wave from a portable telephone base station or the like, differing from this embodiment. The terminal 2020 may locate the position by receiving a radio wave through a local area network (LAN), differing from this embodiment.

(Main Hardware Configuration of Terminal 2020)

Figure 15:
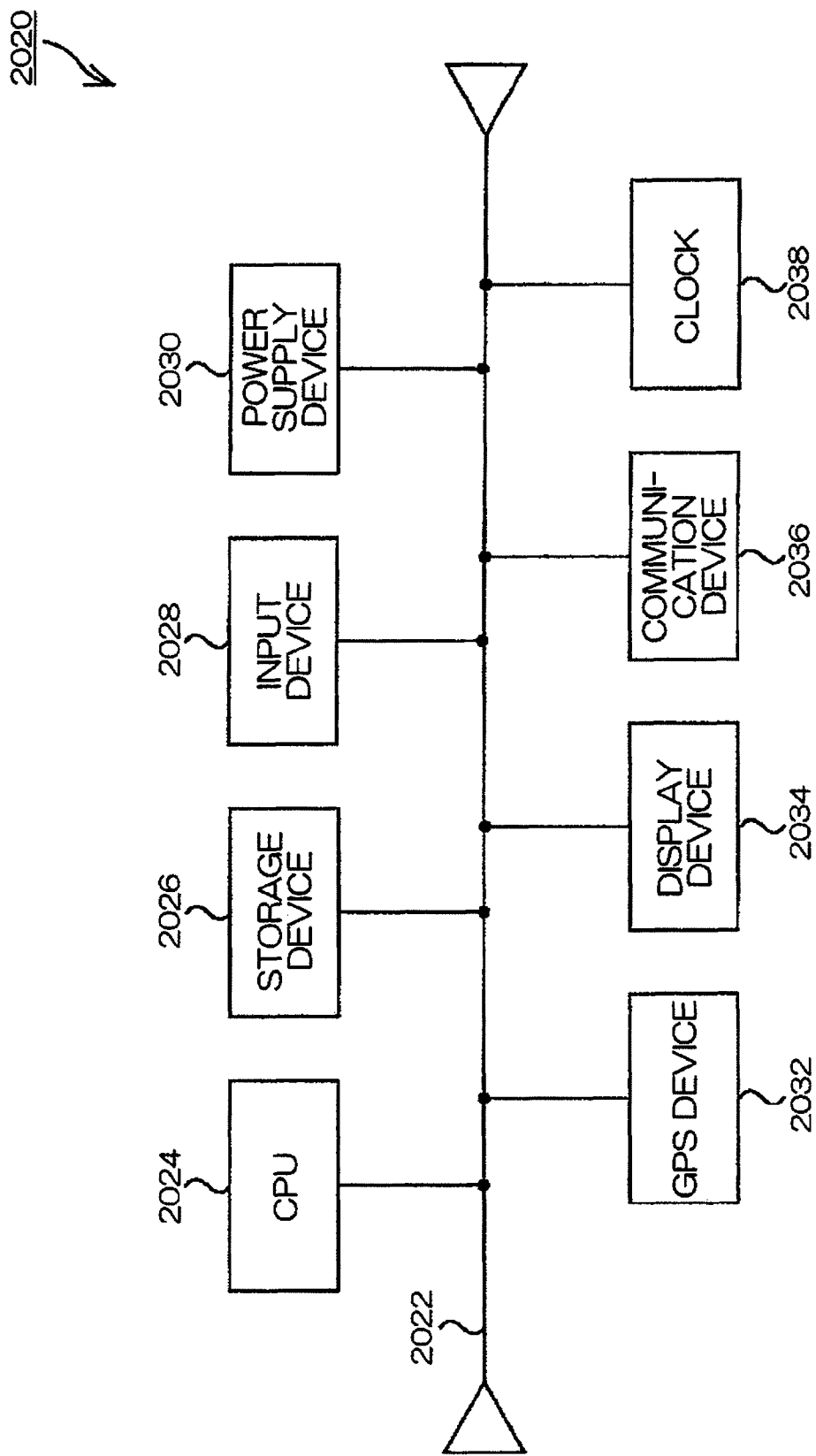
FIG. 15 is a schematic view showing the main software configuration of the terminal according to the second embodiment.

FIG. 15 is a schematic view showing the main hardware configuration of the terminal 2020.

As shown in FIG. 15, the terminal 2020 includes a computer, and the computer includes a bus 2022. A central processing unit (CPU) 2024, a storage device 2026, and the like are connected with the bus 2022. The storage device 2026 is a random access memory (RAM), a read-only memory (ROM), or the like.

An input device 2028, a power supply device 2030, a GPS device 2032, a display device 2034, a communication device 2036, and a clock 2038 are also connected with the bus 2022.

(Configuration of GPS Device 2032)

Figure 16:
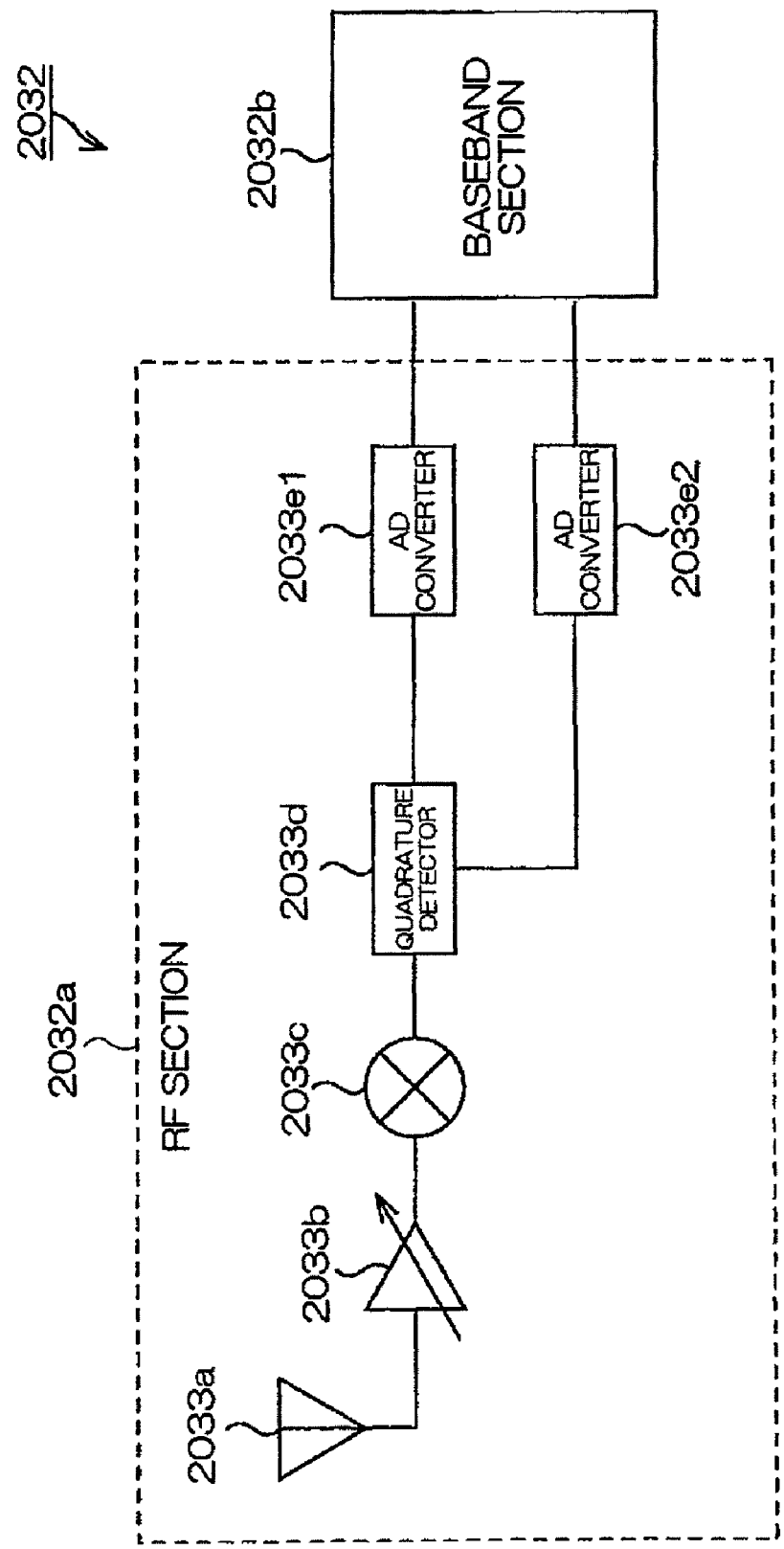
FIG. 16 is a schematic view showing the configuration of a GPS device according to the second embodiment.

FIG. 16 is a schematic view showing the configuration of the GPS device 2032.

As shown in FIG. 16, the GPS device 2032 includes an RF section 2032*a* and a baseband section 2032*b*.

The RF section 2032*a* receives the radio waves S1 and the like through an antenna 2033*a*. An LNA 2033*b* (amplifier) amplifies the signal such as the C/A code carried on the radio wave S1. A mixer 2033*c* down-converts the frequency of the signal. A quadrature (IQ) detector 2033*d* separates the signal. A/D converters 2033*e*1 and 2033*e*2 convert the separated signals into digital signals.

The baseband section 2032*b* receives the digitally-converted signals from the RF section 2032*a*, samples and accumulates each chip (not shown) of the signals, and correlates the signals with the C/A code held by the baseband section 2032b. The baseband section 2032b includes 128 correlators (not shown) and accumulators (not shown), and can perform a correlation process at the same time for 128 phases. The correlator is a configuration for performing the coherent process described later. The accumulator is a configuration for performing the incoherent process described later.

(Main Software Configuration of Terminal 2020)

Figure 17:
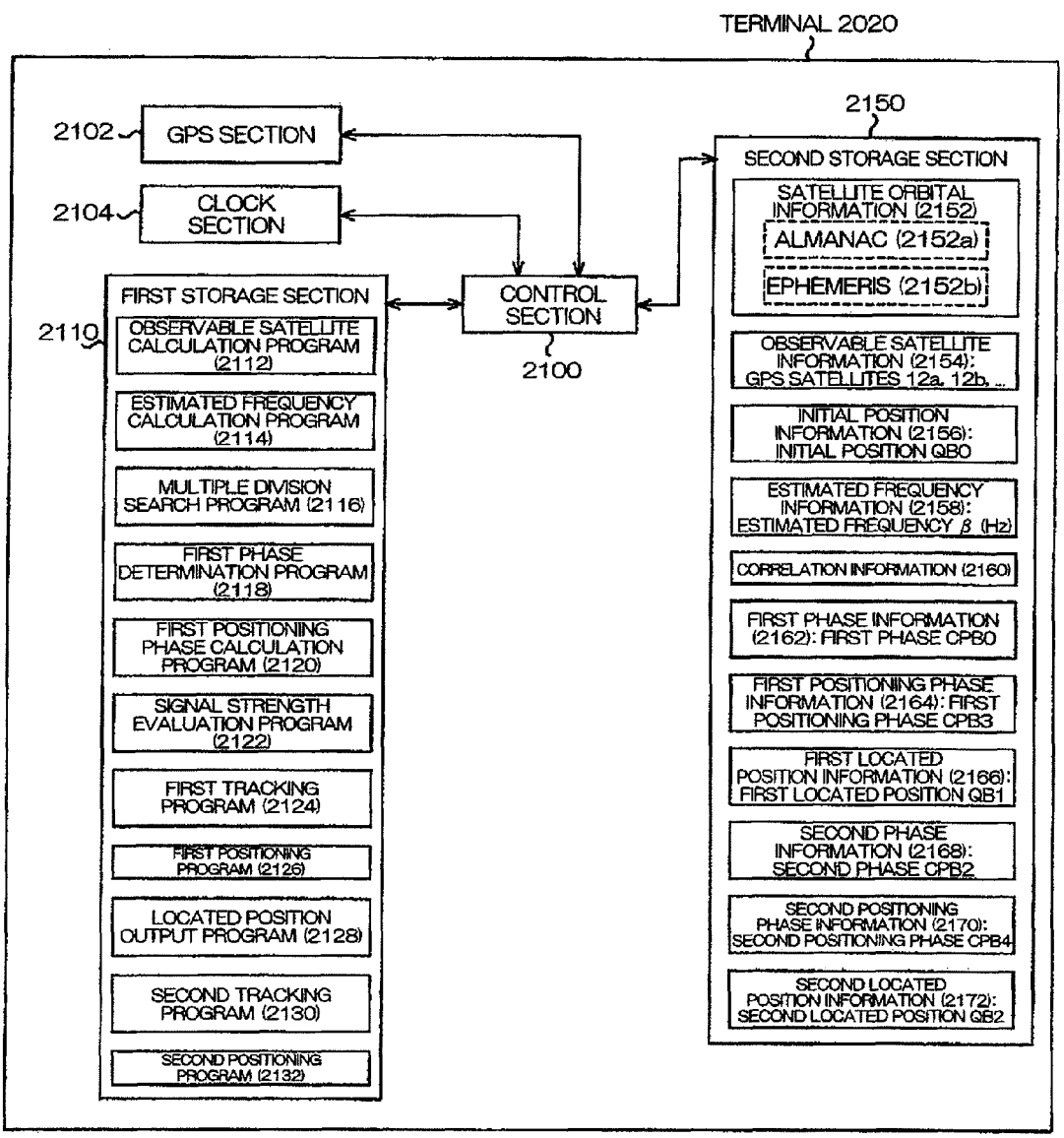
FIG. 17 is a schematic view showing the main software configuration of the terminal according to the second embodiment.

FIG. 17 is a schematic view showing the main software configuration of the terminal 2020.

As shown in FIG. 17, the terminal 2020 includes a control section 2100 which controls each section, a GPS section 2102 corresponding to the GPS device 2032 shown in FIG. 15, a clock section 2104 corresponding to the clock 2038, and the like.

The terminal 2020 also includes a first storage section 2110 which stores various programs, and a second storage section 2150 which stores various types of information.

As shown in FIG. 17, the terminal 2020 stores a navigation message 2152 in the second storage section 2150. The navigation message 2152 includes an almanac 2152a and an ephemeris 2152b.

The terminal 2020 uses the almanac 2152a and the ephemeris 2152b for positioning.

As shown in FIG. 17, the terminal 2020 stores an observable satellite calculation program 2112 in the first storage section 2110. The observable satellite calculation program 2112 is a program for causing the control section 2100 to calculate the observable GPS satellites 12a and the like based on an initial position QB0 indicated by initial position information 2156.

In more detail, the control section 2100 determines the GPS satellites 12a and the like which can be observed at the present time measured by the clock section 2104 referring to the almanac 2152a. The initial position QB0 is the preceding located position, for example.

The control section 2100 stores observable satellite information 2154 indicating the observable GPS satellites 12a and the like in the second storage section 2150.

As shown in FIG. 17, the terminal 2020 stores an estimated frequency calculation program 2114 in the first storage section 2110. The estimated frequency calculation program 2114 is a program for causing the control section 2100 to estimate the reception frequency of the radio waves S1 and the like from the GPS satellites 12a and the like.

FIG. 18 is a view illustrative of the estimated frequency calculation program 2114.

As shown in FIG. 18, the control section 2100 adds a Doppler shift H2 to a transmission frequency H1 from the GPS satellites 12a and the like to calculate an estimated frequency β. The transmission frequency from the GPS satellites 12a and the like is known (e.g. 1575.42 MHz).

The Doppler shift H2 occurs due to the relative movement of each of the GPS satellites 12a and the like and the terminal 2020. The control section 2100 calculates the line-of-sight velocity (velocity in the direction of the terminal 2020) of each of the GPS satellites 12a and the like at the present time using the ephemeris 2152b. The control section 2100 calculates the Doppler shift H2 based on the line-of-sight velocity.

The control section 2100 calculates the estimated frequency β for each of the GPS satellites 12a and the like.

The estimated frequency β includes an error of drift of a clock (reference oscillator: not shown) of the terminal 2020. The term "drift" refers to a change in oscillation frequency due to a change in temperature.

Therefore, the control section 2100 searches for the radio waves S1 and the like around the estimated frequency β over a frequency range with a specific width. For example, the control section 2100 searches for the radio waves S1 and the like at intervals of 100 Hz within the range from (A−100) kHz to (A+100) kHz.

As shown in FIG. 17, the terminal 2020 stores a multiple division search program 2116 in the first storage section 2110. The multiple division search program 2116 is a program for causing the control section 2100 to correlate the C/A code received from the GPS satellites 12a and the like with the C/A code replica generated by the terminal 2020 at intervals of a phase width obtained by equally dividing the phase range specified by the chip into at least three sections to calculate the correlation value. The multiple division search program 2116 and the control section 2100 exemplify a first correlation value calculation section. The C/A code replica exemplifies a positioning base code replica.

Figure 19A:
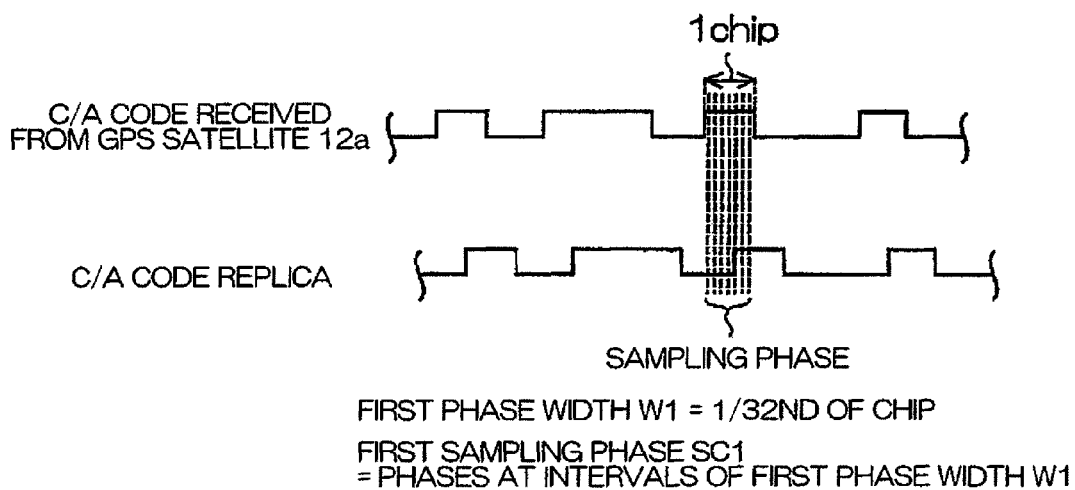
FIG. 19A is a view illustrative of division of a C/A code for illustrating a multiple division search program according to the second embodiment.
Figure 19B:
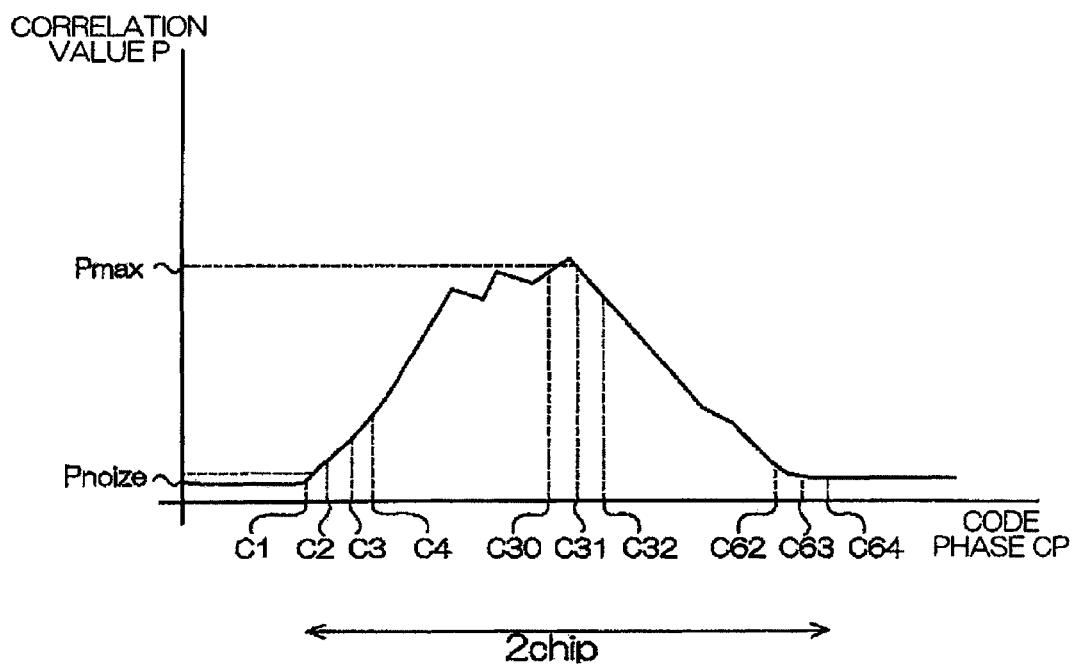
FIG. 19B is a view showing the relationship between a phase and a correlation value for illustrating the multiple division search program.

FIG. 19A and FIG. 19B are views illustrative of the multiple division search program 2116.

As shown in FIG. 19A, the control section 2100 equally divides one chip of the C/A code using the baseband section 2032b, and performs the correlation process, for example. One chip of the C/A code is equally divided into 32 sections, for example. Specifically, the control section 1100 performs the correlation process at intervals of a phase width of 1/32nd of a chip (first phase width W1). The first phase width W1 exemplifies a first divided phase width. The phases at intervals of the first phase width W1 when the control section 2100 performs the correlation process are called first sampling phases SC1. The first sampling phase SC1 exemplifies a first sampling phase.

The first phase width W1 is specified as a phase width which allows detection of the maximum correlation value Pmax when the signal strength is −155 dBm or more. A simulation revealed that the maximum correlation value Pmax can be detected when the signal strength is −155 dBm or more by using a phase width of 1/32nd of a chip, even if the electric field is weak.

As shown in FIG. 19B, the correlation values P corresponding to phases C1 to C64 of two chips are output from the baseband section 2032b. Each of the phases C1 to C64 is the first sampling phase SC1.

The control section 2100 searches for the first chip to the 1023rd chip of the C/A code based on the multiple division search program 2116, for example.

The search based on the multiple division search program 2116 is called a multiple division search.

The correlation process is made up of the coherent process and the incoherent process.

The coherent process is a process in which the baseband section 2032b correlates the received C/A code with the C/A code replica.

For example, when the coherent time is 20 msec, the correlation value of the C/A code synchronously accumulated over 20 msec and the C/A code replica and the like are calculated. The correlated phase and the correlation value are output as a result of the coherent process.

The incoherent process is a process in which the incoherent value is calculated by accumulating the correlation values as the coherent results.

The phase output by the coherent process and the incoherent value are output as a result of the incoherent process. The correlation value P is the incoherent value.

The control section 2100 stores correlation information 2160 indicating the phases C1 to C64 subjected to the correlation process and the correlation value P in the second storage section 2150.

The terminal 2020 stores a first phase determination program 2118 in the first storage section 2110. The first phase determination program 2118 is a program for causing the control section 2100 to determine a first phase CPB0 which is a phase corresponding to the maximum correlation value Pmax. The first phase CPB0 exemplifies a first phase. The first phase determination program 2118 and the control section 2100 exemplify a first phase determination section.

Figure 20:
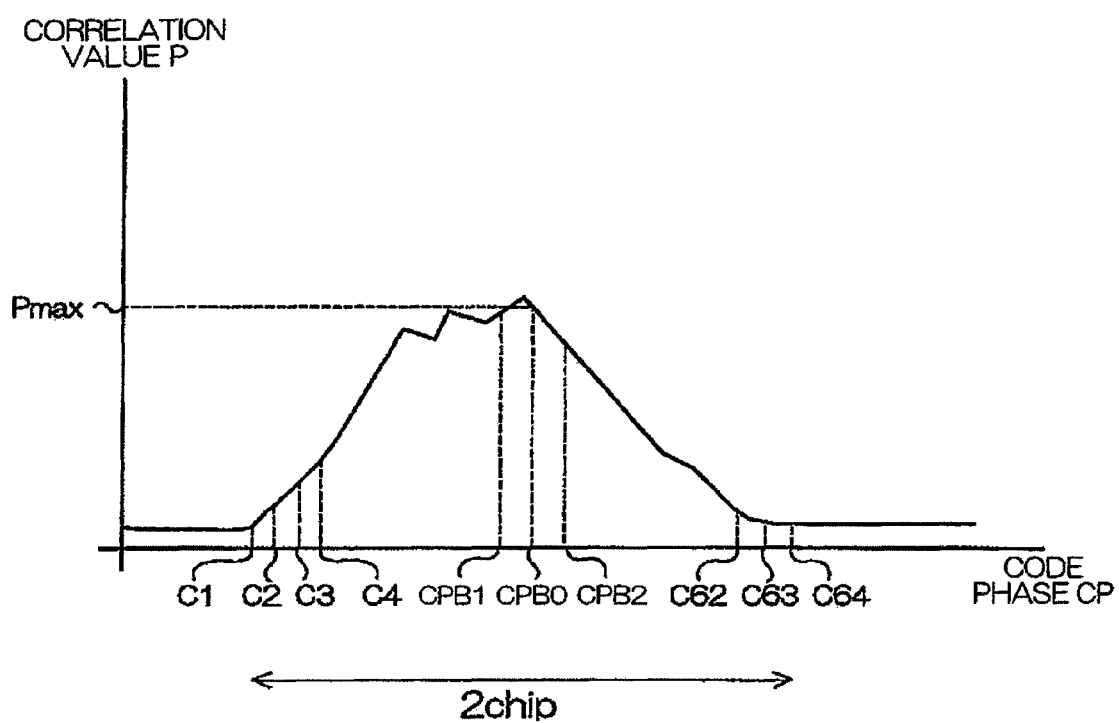
FIG. 20 is a view illustrative of a first phase determination program according to the second embodiment.

FIG. 20 shows an example of the first phase determination program 2118.

The correlation information 2160 may be expressed by the graph shown in FIG. 20 (hereinafter called "correlation value graph").

As shown in FIG. 20, the control section 2100 determines the first phase CPB0 corresponding to the correlation value Pmax referring to the correlation information 2160.

The control section 2100 stores first phase information 2162 indicating the first phase CPB0 in the second storage section 2150.

The terminal 2020 stores a first positioning phase calculation program 2120 in the first storage section 2110. The first positioning phase calculation program 2120 is a program for causing the control section 2100 to calculate a first positioning phase CPB3 used for positioning based on three consecutive first sampling phases SC1 including the first phase CPB0 and the correlation values P corresponding to the three first sampling phases SC1. The first positioning phase calculation program 2120 and the control section 2100 exemplify a first positioning phase calculation section.

Figure 21A:
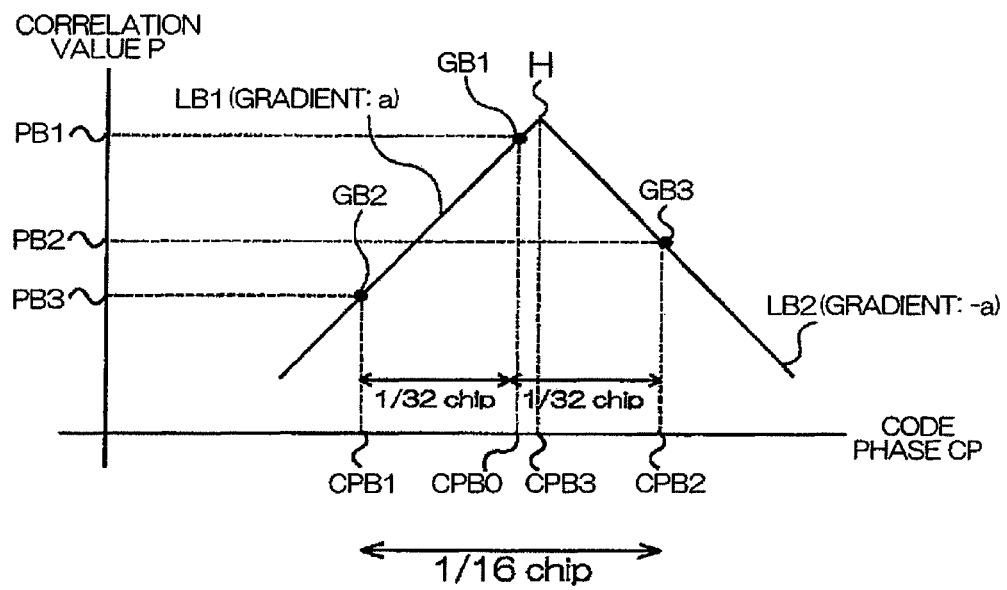
FIG. 21A is a view showing an example of the relationship between a phase and a correlation value for illustrating a first positioning phase calculation program according to the second embodiment.
Figure 21B:
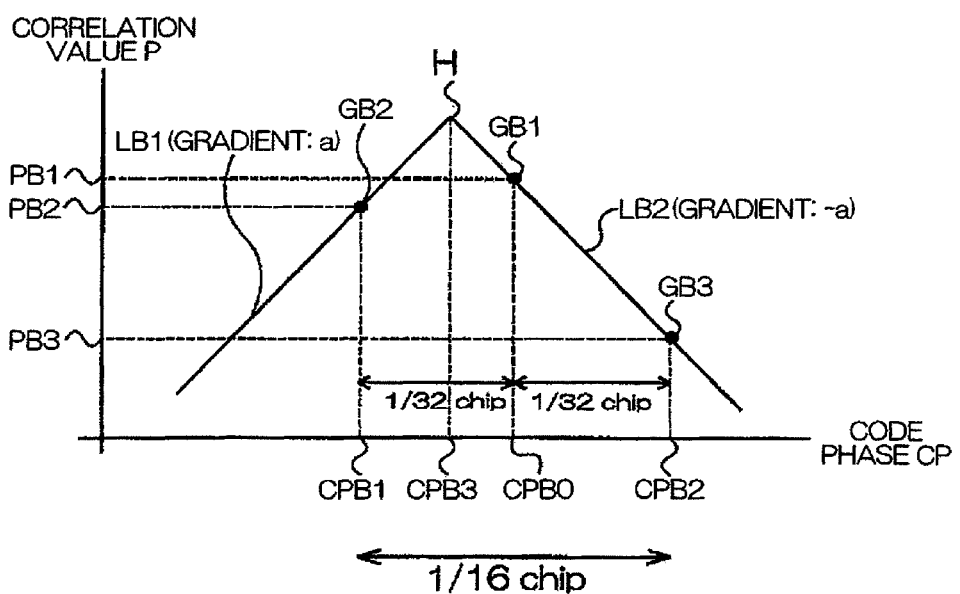
FIG. 21B is a view showing another example of the relationship between a phase and a correlation value.

FIG. 21A and FIG. 21B are views illustrative of the first positioning phase calculation program 2120.

Figure 22A:
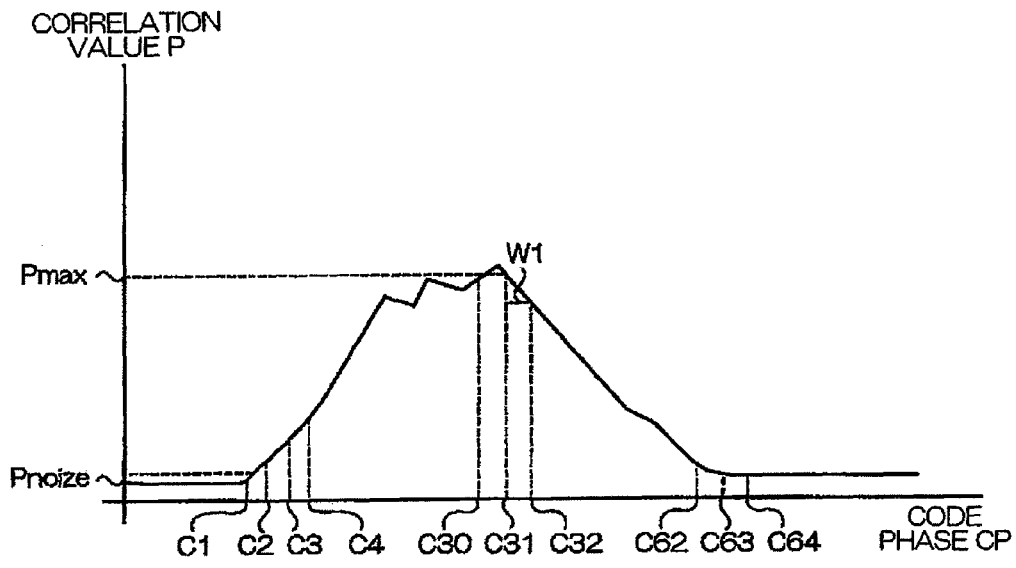
FIG. 22A is a view illustrative of the process of a first tracking program according to the second embodiment.
Figure 22B:
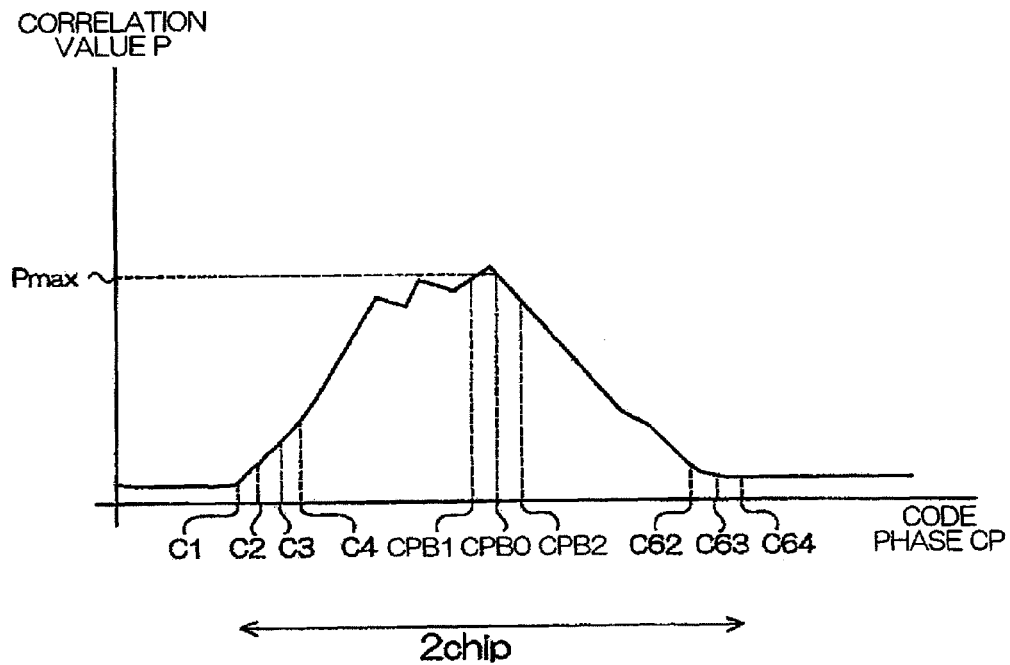
FIG. 22B is a view illustrative of the process of the first tracking program.

FIG. 21A and FIG. 21B are enlarged views showing a portion near the first phase CPB0 shown in FIG. 22B.

Even if the signal strength is extremely low, the correlation values P form an approximate isosceles triangle (shape near the vertex of approximate isosceles triangle) within a narrow phase range in coordinates of which the vertical axis indicates the correlation value P and the horizontal axis indicates the code phase CP.

The two oblique sides of the isosceles triangle can be determined by determining three points in the correlation value graph. The phase corresponding to the vertex is the first positioning phase CPB3.

As shown in FIG. 21A, phases CPB1 and CPB2 continuous with the first phase CPB0 are used, for example. The phase CPB1 is a phase which advances from the first phase CPB0 by 1/32nd of a chip. The phase CPB2 is a phase which is delayed from the first phase CPB0 by 1/32nd of a chip.

In the correlation value graph, a point GB1 is specified by the first phase CPB0 and the correlation value PB1. Likewise, a point GB2 is specified by the first phase CPB1 and the correlation value PB3. A point GB3 is specified by the first phase CPB2 and the correlation value PB2.

Since the first phase CPB0 is a phase corresponding to the maximum correlation value Pmax, the correlation value PB1 (Pmax) corresponding to the first phase CPB0 is greater than the correlation value PB3 of the phase CPB1 and the correlation value PB2 of the phase CPB2.

As shown in FIG. 21A, when the correlation value PB3 of the phase CPB1 is smaller than the correlation value PB2 of the phase CPB2, the points GB2 and GB1 exist on a single straight line. A straight line LB1 is formed by connecting the points GB2 and GB1. The gradient of the straight line LB1 is referred to as a (a is a positive number).

The gradient of the other oblique side of the isosceles triangle shown in the correlation value graph is −a. The point GB3 exists on the oblique side with a gradient of −a. A straight line LB2 is specified by the gradient −a and the point GB3.

A portion near the vertex of the isosceles triangle in the correlation value graph is formed by connecting the straight line LB1 and the straight line LB2. The vertex H can be determined by forming the portion near the vertex. The phase CPB3 corresponding to the vertex H is the first positioning phase CPB3.

As shown in FIG. 21B, when the correlation value PB3 of the phase CPB1 is greater than the correlation value PB2 of the phase CPB2, the points GB1 and GB3 exist on a single straight line. A straight line LB2 is formed by connecting the points GB1 and GB3. The gradient of the straight line LB2 is referred to as −a (a is a positive number).

The gradient of the other oblique side of the isosceles triangle shown in the correlation value graph is a. The point GB2 exists on the oblique side with the gradient a. A straight line LB1 is specified by the gradient a and the point GB2.

A portion near the vertex of the isosceles triangle in the correlation value graph is formed by connecting the straight line LB1 and the straight line LB2. The vertex H can be determined by forming the portion near the vertex. The phase CPB3 corresponding to the vertex H is the first positioning phase CPB3.

The control section 2100 stores first positioning phase information 2166 indicating the first positioning phase CPB3 in the second storage section 2150.

As shown in FIG. 17, the terminal 2020 stores a signal strength evaluation program 2122 in the first storage section 2110. The signal strength evaluation program 2122 is a program for causing the control section 2100 to determine whether or not the signal strength (radio wave strength) of the radio waves S1 and the like which carry the C/A code is −155 dBm or more. A range of −155 dBm or more exemplifies a predetermined reception strength range. The signal strength evaluation program 2122 and the control section 2100 exemplify a reception strength range determination section.

In more detail, the control section 2100 calculates the strength of the signal input to the antenna 2033a (see FIG. 16) from the maximum correlation value Pmax. Since the relationship between the maximum correlation value Pmax and the signal strength is known, the control section 2100 can calculate the signal strength input to the antenna 2033a from the maximum correlation value Pmax.

As shown in FIG. 17, the terminal 2020 stores a first tracking program 2124 in the first storage section 2110. The first tracking program 2124 is a program for causing the control section 2100 to continuously calculate the first positioning phase CPB3 when the control section 2100 has determined that the radio wave strength is −155 dBm or more based on the signal strength evaluation program 2122.

FIG. 22A and FIG. 22B are views illustrative of the first tracking program 2124.

As shown in FIG. 22A, the control section 2100 performs control similar to the control based on the multiple division search program 2116 based on the first tracking program 2124 excluding the search initiation phase. Since the first positioning phase CPB3 has been calculated when performing control based on the first tracking program 2124, the control section 2100 searches for the phase around the first positioning phase CPB3.

As shown in FIG. 22B, the control section 2100 determines the first phase CPB0 based on the first tracking program 2124 in the same manner as in control based on the first phase determination program 2118.

The control section 2100 searches for the phase in the range of ±256 chips around the first phase CPB3 which has been calculated.

The control section 2100 searches for the frequency in 100 Hz units within the range of ±1.0 kHz around the estimated frequency β.

The control section 2100 calculates the first positioning phase CPB3 based on the first phase CPB0 and the phases CPB1 and CPB2 in the same manner as in control based on the first positioning phase calculation program 2120.

The tracking condition of the first tracking program 2124 is called a first tracking condition.

As shown in FIG. 17, the terminal 2020 stores a first positioning program 2126 in the first storage section 2110. The first positioning program 2126 is a program for causing the control section 2100 to locate the present position based on the first positioning phases CPB3 corresponding to three or more GPS satellites 12a and the like and calculate the located position QB1. The first positioning program 2126 and the control section 2100 exemplify a first located position calculation section.

Figure 23:
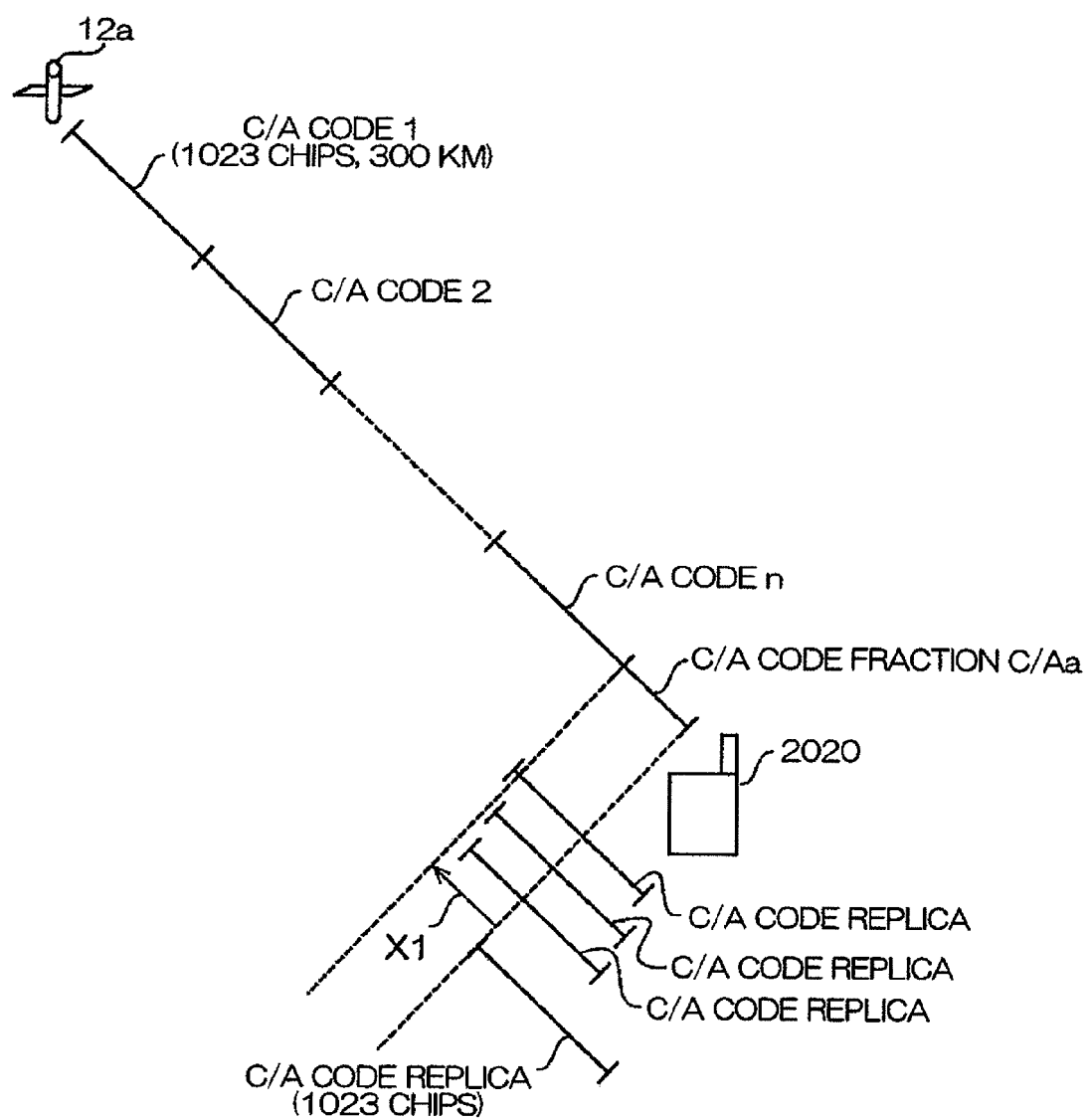
FIG. 23 is a schematic view showing a positioning method according to the second embodiment.

FIG. 23 is a schematic view showing a positioning method.

As shown in FIG. 23, it may be considered that n C/A codes continuously line up between the GPS satellite 12a and the terminal 2020, for example. Since the distance between the GPS satellite 12a and the terminal 2020 is not necessarily a multiple of the length of the C/A code, a code fraction C/Aa exists. Specifically, a portion of a multiple of the C/A code and a fraction portion exist between the GPS satellite 12a and the terminal 2020. The total length of the portion of a multiple of the C/A code and the fraction portion is the pseudo-range. The terminal 2020 locates the position using the pseudo-range.

The position of the GPS satellite 12a in the orbit can be calculated using the ephemeris 2152b. The portion of a multiple of the C/A code can be specified by calculating the distance between the position of the GPS satellite 12a in the orbit and the initial position QB0.

As shown in FIG. 23, the correlation process is performed while moving the phase of the C/A code replica in the direction indicated by X1, for example.

The phase of which the correlation value becomes maximum is the code fraction C/Aa. The code fraction C/Aa is the first positioning phase CPB3.

The control section 2100 calculates the pseudo-range between each of the GPS satellites 12a and the like and the terminal 2020 based on the first positioning phases CPB3 corresponding to three or more GPS satellites 12a and the like. The position of each of the GPS satellites 12a and the like in the orbit is calculated using the ephemeris 2152b. The control section 2100 locates the present position based on the position of each of three or more GPS satellites 12a and the like in the orbit and the pseudo-range, and calculates the located position QB1.

The control section 2100 stores first located position information 2166 indicating the located position QB1 in the second storage section 2150.

As shown in FIG. 17, the terminal 2020 stores a located position output program 2128 in the first storage section 2110. The located position output program 2128 is a program for causing the control section 2100 to display the located position QB1 or a located position QB2 described later on the display device 2034.

As shown in FIG. 17, the terminal 2020 stores a second tracking program 2130 in the first storage section 2110. The second tracking program 2130 is a program for causing the control section 2100 to continuously calculate a second positioning phase CPB4 when the control section 2100 has determined that the radio wave strength is not −155 dBm or more based on the signal strength evaluation program 2122.

The operation of the terminal 2020 based on the second tracking program 2130 is the same as the operation of the terminal 2020 based on the first tracking program 2124 excluding the search phase width.

Figure 24A:
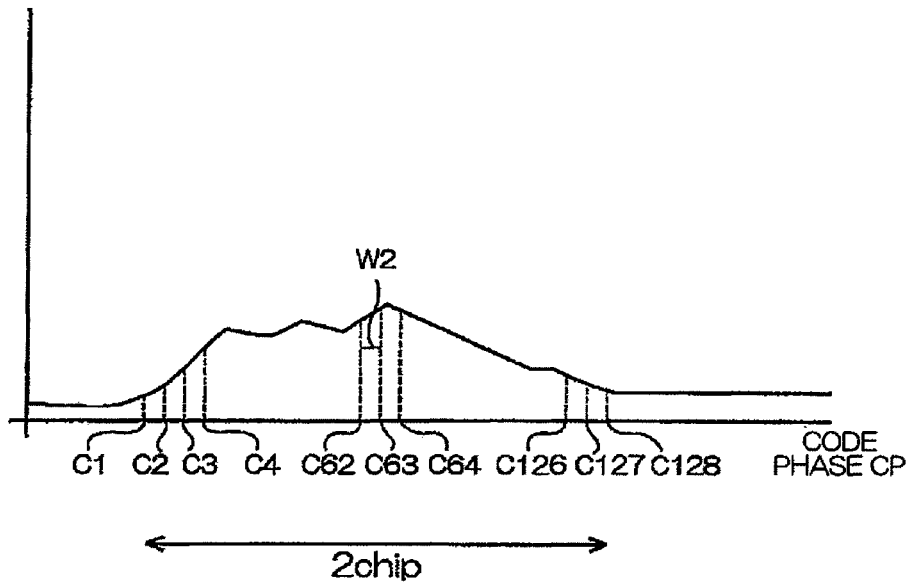
FIG. 24A is a view illustrative of the process of a second tracking program according to the second embodiment.
Figure 24B:
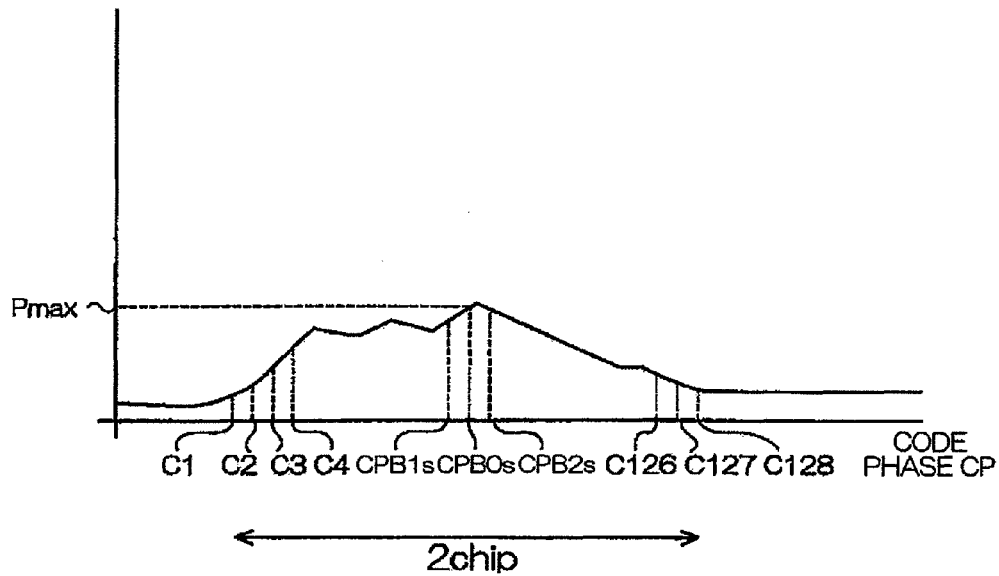
FIG. 24B is a view illustrative of the process of the second tracking program.

FIG. 24A and FIG. 24B are views illustrative of the second tracking program 2130.

As shown in FIG. 24A, the baseband section 2032b (see FIG. 16) performs the correlation process in units of phases (second sampling phase SC2) at intervals of a phase width (second phase width W2) obtained by equally dividing the phase range of two chips into 128 sections. This means that one chip is equally divided into 64 sections. The second phase width W2 is smaller than the first phase width W1. The second phase width W2 exemplifies a second divided phase width. The second sampling phase SC2 exemplifies a second sampling phase.

The second phase width W2 is specified as a phase width which allows detection of the maximum correlation value Pmax even when the signal strength is less than −155 dBm. A simulation revealed that the maximum correlation value Pmax can be detected even when the signal strength is less than −155 dBm by using a phase width of 1/64th of a chip.

The control section 2100 searches for the phase in the range of ±128 chips around the first positioning phase CPB3 which has been calculated. This code phase search width is smaller than that of the first tracking condition. This enables the second phase CPB02 and the second positioning phase CPB4 described later to be more accurately calculated.

The control section 2100 searches for the frequency in 50 Hz units within the range of ±0.5 kHz around the preceding reception frequency. This frequency search width is smaller than that of the first tracking condition. This also enables the second phase CPB02 and the second positioning phase CPB4 described later to be more accurately calculated.

The tracking condition of the second tracking program 2130 is called a second tracking condition.

As shown in FIG. 24B, the control section 2100 determines a phase CPB0s corresponding to the maximum correlation value Pmax, and determines a phase CPB1s which advances from the phase CPB0s by 1/64th of a chip and a phase CPB2s which is delayed from the phase CPB0s by 1/64th of a chip. The control section 2100 calculates the second positioning phase CPB4 by a process similar to control based on the first tracking program 2124.

The control section 2100 stores second positioning phase information 2168 indicating the second positioning phase CPB4 in the second storage section 2150.

As shown in FIG. 17, the terminal 2020 stores a second positioning program 2132 in the first storage section 2110. The second positioning program 2132 is a program for causing the control section 2100 to locate the present position based on the second positioning phases CPB4 corresponding to three or more GPS satellites 12a and the like and calculate the located position QB2. The second positioning program 2132 and the control section 2100 exemplify a second located position calculation section.

The control section 2100 calculates the pseudo-range between each of the GPS satellites 12a and the like and the terminal 2020 based on the second positioning phase CPB4. The position of each of the GPS satellites 12a and the like in the orbit is calculated using the ephemeris 2152b. The control section 2100 locates the present position based on the position of each of three or more GPS satellites 12a and the like in the orbit and the pseudo-range, and calculates the located position QB2.

The control section 2100 stores second located position information 2170 indicating the located position QB2 in the second storage section 2150.

The control section 2100 outputs the located position QB2 to the display device 2034 (see FIG. 15) based on the located position output program 2130.

The terminal 2020 is configured as described above.

The terminal 2020 can calculate the correlation values of at least three first sampling phases CS1 in chip units.

The terminal 2020 can determine the first phase CPB0.

The terminal 2020 can calculate the first positioning phase CPB3.

When the signal strength is −155 dBm or more, the terminal 2020 can calculate the located position QB1 using the first positioning phases CPB3 corresponding to three or more GPS satellites 12a and the like.

As described above, the correlation values of the phases EARLY and LATE may become equal at a plurality of positions in a weak electric field. On the other hand, only one first phase CPB0 corresponds to the maximum correlation value.

Therefore, the true phase exists in the range of 1/32nd of a chip with respect to the first phase CPB0.

Since the graph of the correlation value P forms an approximate isosceles triangle near the first phase CPB0 even in a weak electric field, the first positioning phase CPB3 which is the phase corresponding to the vertex of the isosceles triangle can be calculated from three sampling phases including the first phase CPB0 and the corresponding correlation values P. The first positioning phase CPB3 is closer to the true phase than the first phase CPB0.

This enables the phase of the received positioning base code to be accurately estimated even in a weak electric field in which the signal strength is extremely low.

When the signal strength is less than −155 dBm, the terminal 2020 can perform the correlation process of the C/A code replica and the received C/A code in units of the second sampling phases CS2, and calculate the correlation value P.

The terminal 2020 can determine the second phase CPB02.

The terminal 2020 can calculate the second positioning phase CPB4.

Therefore, the second positioning phase CP4 is closer to the true phase than the first positioning phase CPB3.

This enables the phase of the received C/A code to be accurately estimated even in a weak electric field in which the signal strength is extremely low.

The configuration of the terminal 2020 according to the second embodiment has been described above. An operation example of the terminal 2020 is described below mainly using FIG. 25.

Figure 25:
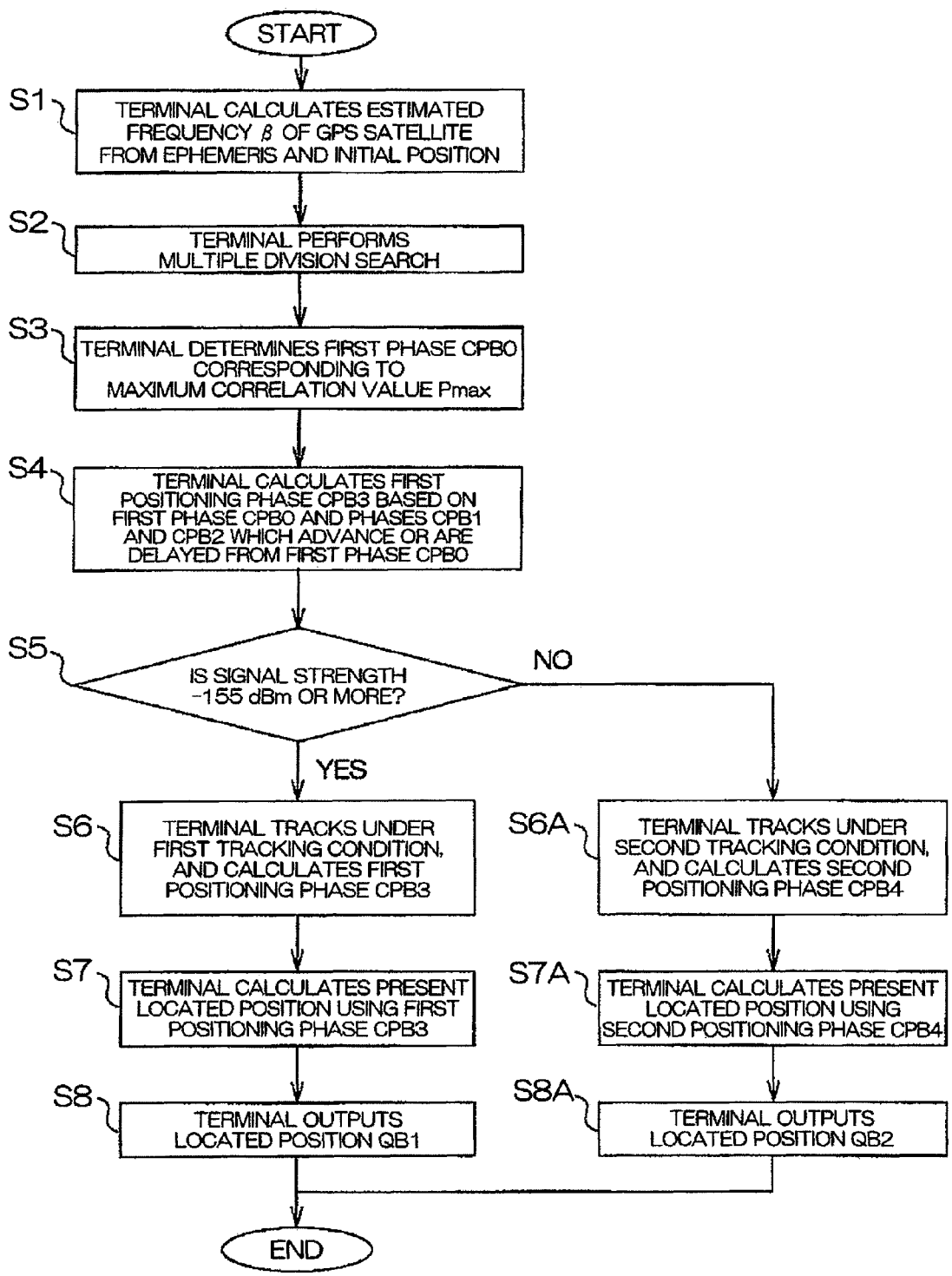
FIG. 25 is a schematic flowchart showing an operation example of the terminal according to the second embodiment.
Figure 26:
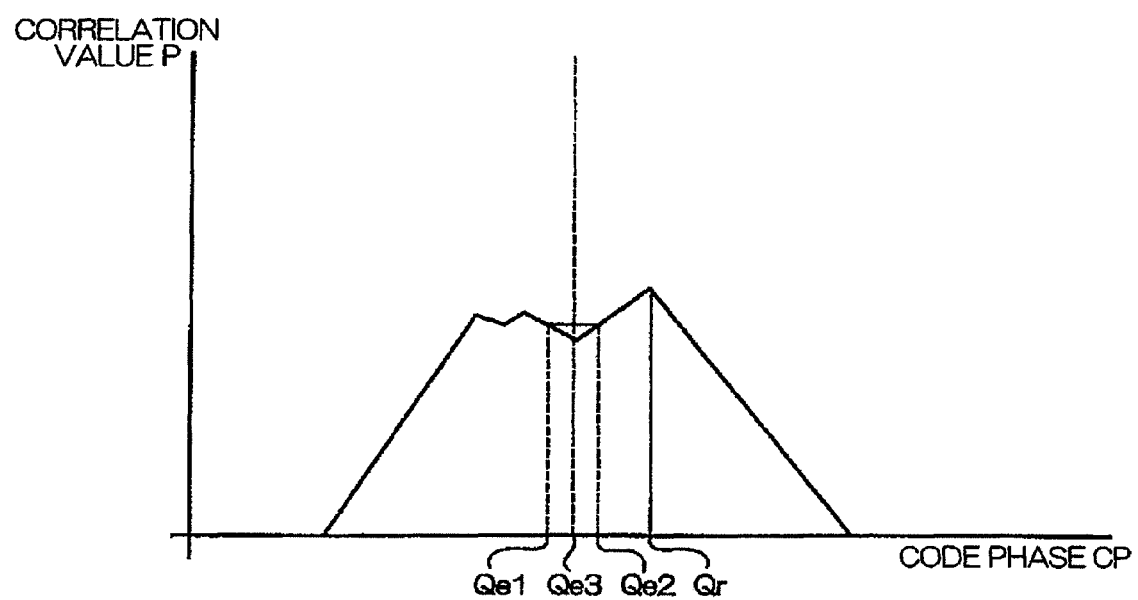
FIG. 26 is a schematic view showing a related art.

FIG. 25 is a schematic flowchart showing an operation example of the terminal 2020.

The terminal 2020 calculates the estimated frequency β (see FIG. 17) of each of the GPS satellites 12a and the like from the ephemeris 152b and the initial position QB0 (see FIG. 17) (step S1 in FIG. 25).

The terminal 2020 performs the multiple division search (step S2). The step S2 exemplifies a first correlation value calculation step.

The terminal 2020 determines the first phase CPB0 (see FIG. 17) corresponding to the maximum correlation value Pmax (step S3). The step S3 exemplifies a first phase determination step.

The terminal 2020 calculates the first positioning phase CPB3 based on the first phase CPB0 and the phases CPB1 and CPB2 which advance or are delayed from the first phase CPB0 (step S4). The step S4 exemplifies a first positioning phase calculation step.

The terminal 2020 determines whether or not the signal strength is −155 dBm or more (step S5).

When the terminal 2020 has determined that the signal strength is −155 dBm or more in the step S5, the terminal 2020 tracks under the first tracking condition, and calculates the first positioning phase CPB3 (step S6).

The terminal 2020 locates the present position using the first positioning phase CPB3, and calculates the located position QB1 (step S7). The step S7 exemplifies a located position calculation step.

The terminal 2020 outputs the located position QB1 (step S8).

When the terminal 2020 has determined that the signal strength is not −155 dBm or more in the step S5, the terminal 2020 tracks under the second tracking condition, and calculates the second positioning phase CPB4 (step S6A).

The terminal 2020 locates the present position using the second positioning phase CPB4, and calculates the located position QB2 (step S7A).

The terminal 2020 outputs the located position QB2 (step S8A).

The above steps enable the phase of the received C/A code to be accurately estimated even in a weak electric field in which the signal strength is extremely low to a further extent.

Note that the invention is not limited to the above embodiments. Note also that the above embodiments may be configured in combination.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention.

What is claimed is:

1. A positioning device comprising:
a receiving section that receives a positioning signal from a positioning satellite;
a correlation value calculation section that calculates correlation values of the positioning signal and a signal replica in sampling phases, the sampling phases being set at intervals of a given phase of the positioning signal;
a phase selection section that selects a sampling phase corresponding to a maximum correlation value among the correlation values calculated by the correlation value calculation section;
a positioning phase calculation section that calculates a positioning phase based on a shape near a vertex of an isosceles triangle formed on a correlation value graph that indicates a relationship between a phase and a correlation value, using three consecutive sampling phases including the sampling phase selected by the phase selection section and the correlation values corresponding to the three consecutive sampling phases, the positioning phase corresponding to the vertex of the isosceles triangle; and
a positioning section that calculates a present position using the positioning phase.

2. The positioning device as defined in claim 1,
the positioning phase calculation section selecting the sampling phase selected by the phase selection section, a sampling phase that advances with respect to the sampling phase selected by the phase selection section, and a sampling phase that is delayed with respect to the sampling phase selected by the phase selection section, as the three consecutive sampling phases, and calculating a phase corresponding to the vertex of the isosceles triangle as the positioning phase by estimating two oblique sides of the isosceles triangle using the three consecutive sampling phases and the correlation values corresponding to the three consecutive sampling phases.

3. The positioning device as defined in claim 1, further comprising:
a signal strength determination section that determines whether a signal strength of the positioning signal is within a first signal strength range or a second signal strength range that is lower than the first signal strength range,
the correlation value calculation section calculating the correlation value using a first phase interval as the interval of the sampling phases when the signal strength of the positioning signal is within the first signal strength range, and calculating the correlation value using a second phase interval as the interval of the sampling phases when the signal strength of the positioning signal is within the second signal strength range, the second phase interval being narrower than the first phase interval.

4. The positioning device as defined in claim 1,
the positioning signal being a C/A Code ((1) Clear and Acquisition Code or (2) Coarse and Access Code) received from the positioning satellite.

5. A method comprising:
receiving a positioning signal from a positioning satellite;
calculating correlation values of the positioning signal and a signal replica in sampling phases, the sampling phases being set at intervals of a given phase of the positioning signal;
selecting a sampling phase corresponding to a maximum correlation value among the calculated correlation values;
calculating a positioning phase based on a shape near a vertex of an isosceles triangle formed on a correlation value graph that indicates a relationship between a phase and a correlation value, using three consecutive sampling phases including the sampling phase selected by the phase selection section and the correlation values corresponding to the three consecutive sampling phases, the positioning phase corresponding to the vertex of the isosceles triangle; and
calculating a present position using the positioning phase.

* * * * *